(12) United States Patent
Chheda et al.

(10) Patent No.: US 10,243,819 B1
(45) Date of Patent: Mar. 26, 2019

(54) TEMPLATE GENERATION BASED ON ANALYSIS

(71) Applicant: Amazon Technologies, Inc., Reno, NV (US)

(72) Inventors: Mahendra Manshi Chheda, Sammamish, WA (US); Christopher Whitaker, Sammamish, WA (US); Frank Stienhans, Menlo Park, CA (US)

(73) Assignee: Amazon Technologies, Inc., Reno, NV (US)

( * ) Notice: Subject to any disclaimer, the term of this patent is extended or adjusted under 35 U.S.C. 154(b) by 786 days.

(21) Appl. No.: 14/226,702

(22) Filed: Mar. 26, 2014

(51) Int. Cl.
*G06F 15/173* (2006.01)
*H04L 12/26* (2006.01)
*H04L 12/24* (2006.01)

(52) U.S. Cl.
CPC ............. *H04L 43/08* (2013.01); *H04L 41/08* (2013.01)

(58) Field of Classification Search
USPC .................................................. 709/224, 226
See application file for complete search history.

(56) References Cited

U.S. PATENT DOCUMENTS

| | | | | |
|---|---|---|---|---|
| 2007/0016897 | A1* | 1/2007 | Todd | G06F 9/5055 717/143 |
| 2011/0295986 | A1* | 12/2011 | Ferris | G06F 9/5072 709/222 |
| 2012/0102498 | A1* | 4/2012 | Subramanya | G06F 9/50 718/104 |
| 2013/0080640 | A1* | 3/2013 | Rai | G06Q 30/0224 709/226 |
| 2015/0067169 | A1* | 3/2015 | Povolny | H04L 47/781 709/226 |

* cited by examiner

*Primary Examiner* — Hee Soo Kim
(74) *Attorney, Agent, or Firm* — Baker & Hostetler LLP

(57) ABSTRACT

In a provider network, recommendations pertaining to resources associated with a customer of the provider network is determined. The recommendations are determined based on an analysis of the resources, a requested use of the resources, and industry best practices associated with the requested use, architectural guidance, cost parameters, and policies, among others. An interface configured to provide the recommendations pertaining to the resources and the requested use is provided. A template based on the recommendations is provided and associated with the customer. The template is usable to configure an instantiation of a resource by the provider network.

19 Claims, 13 Drawing Sheets

FIG. 10

TEMPLATE GENERATION BASED ON ANALYSIS

BACKGROUND

A data center is a facility that houses computer systems and various networking, storage, and other related components. Data centers may, for example, provide computing services to businesses and individuals as a remote computing service or to provide "software as a service" (e.g., cloud computing). To facilitate the utilization of data center resources, virtualization technologies may allow a single physical computing machine to host one or more instances of virtual machines that appear and operate as independent computer machines to a connected computer user. With virtualization, the single physical computing device can create, maintain, or delete virtual machines in a dynamic manner.

Some virtualization technologies are capable of providing virtual resources that span two or more physical resources, such as a single virtual machine with multiple virtual processors that span multiple distinct physical computing systems. As another example, virtualization technologies may allow data storage hardware to be shared among multiple users by providing each user with a virtualized data store that may be distributed across multiple data storage devices, with each such virtualized data store acting as a distinct logical data store that provides users with the illusion that they are the sole operators and administrators of the data storage resource.

In many environments, operators of data centers that implement different types of virtualized computing, storage, and/or other network-accessible resources may allow customers to reserve or purchase access to resources in various resource acquisition modes. The computing resource provider may provide facilities for customers to select and launch the desired computing resources, deploy application components to the computing resources, and maintain an application executing in the environment. The computing resources provided by the computing resource provider may be made available in discrete units, which may be referred to as instances. An instance may represent a physical server hardware platform, a virtual machine instance executing on a server, or some combination of the two. Various types and configurations of instances may be made available, including different sizes of resources executing different operating systems (OS) and/or hypervisors, and with various installed software applications, runtimes, and the like.

BRIEF DESCRIPTION OF DRAWINGS

Throughout the drawings, reference numbers may be reused to indicate correspondence between referenced elements. The drawings are provided to illustrate example embodiments described herein and are not intended to limit the scope of the disclosure:

FIG. 10 is a diagram illustrating an example user interface in accordance with the present disclosure.

DETAILED DESCRIPTION

Figure 1:
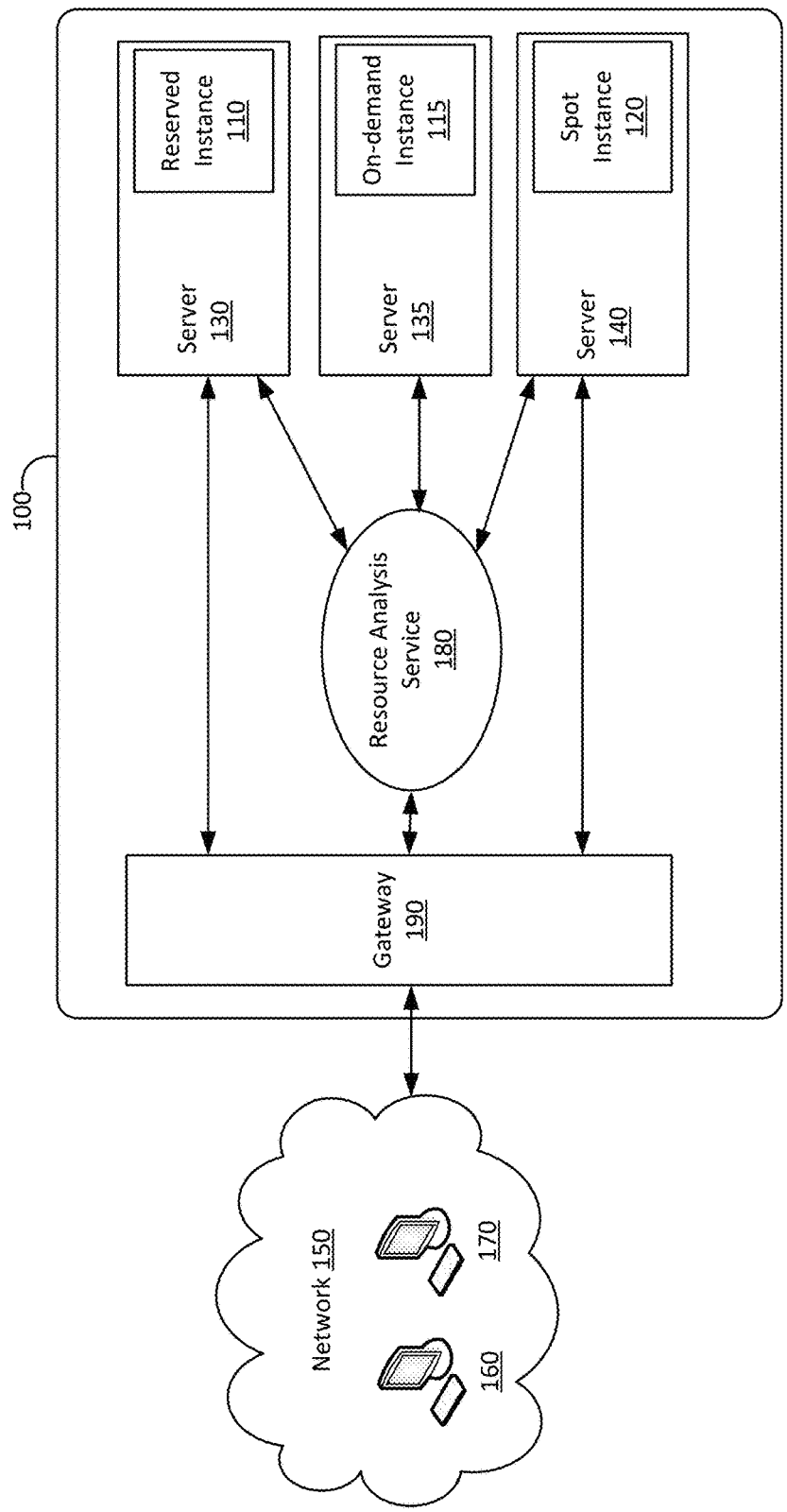
FIG. 1 is a diagram illustrating a mechanism for providing computing resources in accordance with the present disclosure.

A service provider, such as an entity that operates a provider network, may offer computing resources, such as computing instances, and storage resources to customers (who may also be referred to as entities or users). A customer may be any person or entity who accesses computing resources of a service provider. The service provider may, for example, provide a web services platform. Multiple customers may access the web services platform via a computing node and issue instructions to the web services platform. The web services platform may be also be referred to as a multi-tenant web services platform to denote that multiple customers may access the platform. The web services platform may respond to instructions by performing computing operations on one or more of a plurality of computing nodes that make up the web services platform.

Other types of resources may be offered by the provider network. For example, the provider network may provide monitoring of a customer's instances and other resources and applications running on the resources. Such monitoring services may generally be referred to herein as resource analysis services. The monitored information may be useful for collecting and tracking various metrics and providing recommendations regarding resource utilization, application performance, and operational health of the resources associated with customers. Such information may be useful for keeping instances and applications operating smoothly. Recommendations may be made based on analysis of the monitored information and the intended use of the customer's resources. This information may be analyzed to determine if the customer's resources and their configuration are optimized for their intended use. The information may be compared to the provider network's best practices, industry best practices, and other guidance data to match and identify recommendations for the customer's resources.

Customers may further be provided with recommended practices based on the customer's metrics and the service provider's aggregated operational history. For example, the provider network may inspect and analyze a customer's allocated computing resources and generate recommendations that may, if implemented, provide improvements to overall system performance, close security gaps, or provide other improvements and benefits. The provider network may also provide and manage templates that can be used by customers of the provider network. Templates may be used as configuration starting points by customers to create and manage a collection of related resources and provision and update the resources in a predictable way. In some embodiments, the provider network may provide the ability for customers to create templates based on the recommendations generated by the provider network. Customers may use the recommendations to improve their resource configurations and then create templates to launch additional resources based on the templates. Additionally, the customer may modify the templates as desired.

Customers may also be provided the ability to specify one or more requirements such as a business requirement or priority, and the service provider may translate the requirements and priorities into one or more recommended architectures or configurations for fulfilling the requirements and priorities. The recommended architectures or configurations may also be ranked in accordance with the requirements and priorities or other criteria. For example, if the customer's first priority is cost, then the recommended architectures or configurations can be ranked based on cost as a ranking parameter. The recommended architectures or configurations may also be provided as templates that can be used to instantiate one or more computing resources in accordance with the template. Further details will now be described.

FIG. 1 is a diagram illustrating a system 100 including a framework for providing resource analysis in accordance with the present disclosure. In FIG. 1, system 100 may include a reserved virtual machine instance 110, an on-demand virtual machine instance 115, and a spot virtual machine instance 120 that may execute, for example, on one or more server computers 130, 135, and 140, respectively. It will be appreciated that some embodiments may involve additional virtual machine instances of various types that may be instantiated on additional server computers.

FIG. 1 also illustrates a public network 150 that may include one or more computers, such as computers 160 and 170. According to one embodiment, instances 110, 115, and 120 may be configured to provide computing services to a computer user (not shown) of public network 150 via gateway 190 and computers 160 and 170. For example, reserved virtual machine instance 110 may provide a set of remote access enterprise applications to a group of users who may, for example, be employees of an enterprise customer.

A user at computer 160 or 170 may send a request to a resource analysis service 180 for recommendations pertaining to the customer's allocated resources and to generate and manage templates. In some embodiments, a request may be received directly from the user at computer 160 or 170. The request may be also received by other services running on system 100. In response to the receipt of the request, resource analysis service 180 may log the request and provide a response to the request. The resource analysis service 180 may communicate with other services to facilitate: (1) processing of the request, (2) accessing data pertaining to request, and (3) generating interfaces to provide results for the request. The resource analysis service 180 may provide an interface for facilitating submission of the request. The resource analysis service 180 may further provide an interface for viewing the results of the request and taking further actions in response to the request.

Various aspects of the disclosure are now described with regard to certain examples and embodiments, which are intended to illustrate but not to limit the disclosure. It should be appreciated that the subject matter presented herein may be implemented as a computer process, a computer-controlled apparatus, or a computing system or an article of manufacture, such as a computer-readable storage medium. While the subject matter described herein is presented in the general context of program modules that execute on one or more computing devices, those skilled in the art will recognize that other implementations may be performed in combination with other types of program modules. Generally, program modules include routines, programs, components, data structures, and other types of structures that perform particular tasks or implement particular abstract data types.

Those skilled in the art will also appreciate that the subject matter described herein may be practiced on or in conjunction with other computer system configurations beyond those described herein, including multiprocessor systems, microprocessor-based or programmable consumer electronics, minicomputers, mainframe computers, handheld computers, personal digital assistants, e-readers, cellular telephone devices, special purposed hardware devices, network appliances, and the like. The embodiments described herein may also be practiced in distributed computing environments, where tasks are performed by remote processing devices that are linked through a communications network. In a distributed computing environment, program modules may be located in both local and remote memory storage devices.

In the following detailed description, references are made to the accompanying drawings that form a part hereof, and that show, by way of illustration, specific embodiments or examples. The drawings herein are not drawn to scale. Like numerals represent like elements throughout the several figures.

Networks established by or on behalf of an entity, such as a company or organization, to provide one or more services (such as various types of cloud-based computing or storage) accessible via the Internet and/or other networks to a distributed set of clients may be termed provider networks. Such a provider network may include one or more data centers hosting various resource pools, such as collections of physical and/or virtualized computer servers, storage devices, networking equipment, and the like, that may be used to implement and distribute the infrastructure and services offered by the provider network. The resources may in some embodiments be offered to clients in units called "instances," such as virtual or physical compute instances or storage instances. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general purpose or special purpose computer servers, storage devices, network devices, and the like. In some embodiments a client or user may be provided direct access to a resource instance, e.g., by giving a user an administrator login and password. In other embodiments, the provider network operator may allow clients to specify execution requirements for specified client applications and schedule execution of the applications on behalf of the client on execution platforms (such as application server instances, Java™ virtual machines (JVMs), general purpose or special purpose operating systems, platforms that support various interpreted or compiled programming languages, such as Ruby, Perl, Python, C, C++, and the like or high-performance computing platforms) suitable for the applications. This may be done without, for example, requiring the client to access an instance or an execution platform directly. A given execution platform may utilize one or more resource instances in some implementations; in other implementations, multiple execution platforms may be mapped to a single resource instance.

Figure 2:
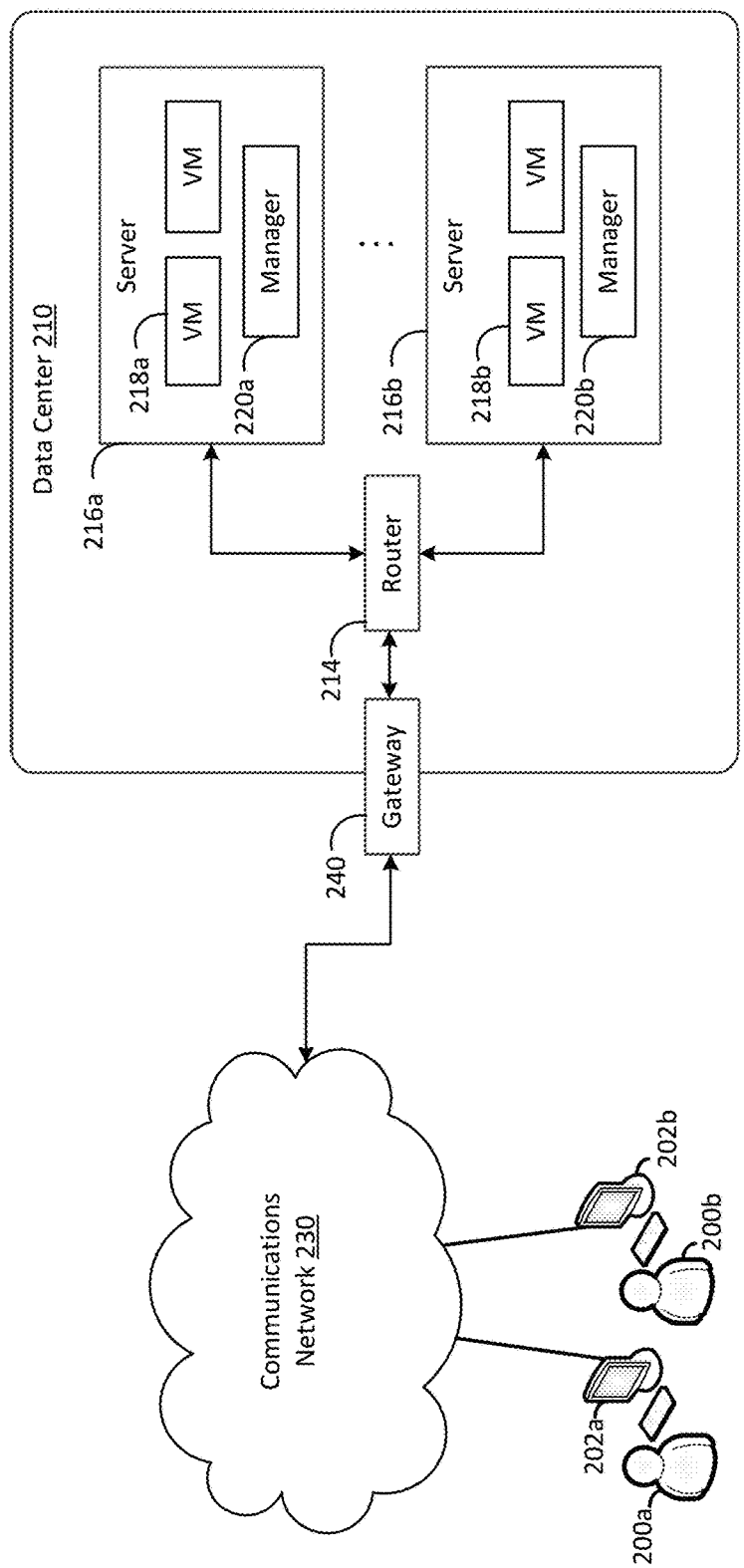
FIG. 2 is a diagram illustrating an example computing system that may be used in some embodiments.

FIG. 2 illustrates an example computing environment in which the embodiments described herein may be implemented. FIG. 2 is a diagram schematically illustrating an example of a data center 210 that can provide computing resources to users 200a and 200b (which may be referred herein singularly as "a user 200" or in the plural as "the users 200") via user computers 202a and 202b (which may be referred herein singularly as "a computer 202" or in the plural as "the computers 202") via a communications network 230. Data center 210 may be configured to provide computing resources for executing applications on a permanent or an as-needed basis. The computing resources provided by data center 210 may include various types of resources, such as data processing resources, data storage resources, data communication resources, and the like. Each type of computing resource may be general purpose or may be available in a number of specific configurations. For example, data processing resources may be available as virtual machine instances. The instances may be configured to execute applications, including web servers, application servers, media servers, database servers, and the like. Data storage resources may include file storage devices, block storage devices, and the like.

Each type or configuration of computing resource may be available in different sizes, such as large resources, consisting of many processors, large amounts of memory, and/or large storage capacity, and small resources consisting of fewer processors, smaller amounts of memory, and/or smaller storage capacity. Customers may choose to allocate a number of small processing resources as web servers and/or one large processing resource as a database server, for example.

Data center 210 may include servers 216a and 216b (which may be referred herein singularly as "a server 216" or in the plural as "the servers 216") that provide computing resources available as virtual machine instances 218a and 218b (which may be referred herein singularly as "a virtual machine instance 218" or in the plural as "the virtual machine instances 218"). The virtual machine instances 218 may be configured to execute applications, including Web servers, application servers, media servers, database servers, and the like. Other resources that may be provided include data storage resources (not shown) and may include file storage devices, block storage devices, and the like.

The availability of virtualization technologies for computing hardware has provided benefits for providing large scale computing resources for customers and allowing computing resources to be efficiently and securely shared between multiple customers. For example, virtualization technologies, such as those provided by VMware or other virtualization systems, may allow a physical computing device to be shared among multiple users by providing each user with one or more virtual machine instances hosted by the physical computing device. A virtual machine instance may be a software emulation of a particular physical computing system that acts as a distinct logical computing system. Such a virtual machine instance provides isolation among multiple operating systems sharing a given physical computing resource. Furthermore, some virtualization technologies may provide virtual resources that span one or more physical resources, such as a single virtual machine instance with multiple virtual processors that spans multiple distinct physical computing systems.

Referring to FIG. 2, communications network 230 may, for example, be a publicly accessible network of linked networks and possibly operated by various distinct parties, such as the Internet. In other embodiments, communications network 230 may be a private network, such as, for example, a corporate or university network that is wholly or partially inaccessible to non-privileged users. In still other embodiments, communications network 230 may include one or more private networks with access to and/or from the Internet.

Communications network 230 may provide access to computers 202. Computers 202 may be computers utilized by customers 200 or other customers of data center 210. For instance, user computer 202a or 202b may be a server, a desktop or laptop personal computer, a tablet computer, a wireless telephone, a personal digital assistant (PDA), an e-book reader, a game console, a set-top box, or any other computing device capable of accessing data center 210. User computer 202a or 202b may connect directly to the Internet (e.g., via a cable modem or a Digital Subscriber Line (DSL)). Although only two user computers 202a and 202b are depicted, it should be appreciated that there may be multiple user computers.

Computers 202 may also be utilized to configure aspects of the computing resources provided by data center 210. In this regard, data center 210 might provide a Web interface through which aspects of its operation may be configured through the use of a Web browser application program executing on user computer 202. Alternatively, a stand-alone application program executing on user computer 202 might access an application programming interface (API) exposed by data center 210 for performing the configuration operations. Other mechanisms for configuring the operation of the data center 210, including deploying updates to an application, might also be utilized.

Servers 216a and 216b (which may be referred herein singularly as "a server 216" or in the plural as "the servers 216") shown in FIG. 2 may be standard servers configured appropriately for providing the computing resources described above and may provide computing resources for executing one or more applications. In one embodiment, the computing resources may be virtual machine instances 218. In the example of virtual machine instances, each of the servers 216 may be configured to execute an instance manager 220a or 220b (which may be referred herein singularly as "an instance manager 220" or in the plural as "the instance managers 220") capable of executing the virtual machine instances. The instance managers 220 may be a virtual machine monitor (VMM) or another type of program configured to enable the execution of virtual machine instances 218 on servers 216, for example. As discussed above, each of the virtual machine instances 218 may be configured to execute all or a portion of an application.

It should be appreciated that although the embodiments disclosed above discuss the context of virtual machine instances, other types of implementations can be utilized with the concepts and technologies disclosed herein. For example, the embodiments disclosed herein might also be utilized with computing systems that do not utilize virtual machine instances.

In the example data center 210 shown in FIG. 2, a router 214 may be utilized to interconnect the servers 216a and 216b. Router 214 may also be connected to gateway 240, which is connected to communications network 230. Router 214 may manage communications within networks in data center 210, for example, by forwarding packets or other data communications as appropriate based on characteristics of such communications (e.g., header information including source and/or destination addresses, protocol identifiers, etc.) and/or the characteristics of the private network (e.g., routes based on network topology, etc.). It will be appreciated that, for the sake of simplicity, various aspects of the computing systems and other devices of this example are illustrated without showing certain conventional details. Additional computing systems and other devices may be interconnected in other embodiments and may be interconnected in different ways.

It should be appreciated that the network topology illustrated in FIG. 2 has been greatly simplified and that many more networks and networking devices may be utilized to interconnect the various computing systems disclosed herein. These network topologies and devices should be apparent to those skilled in the art.

It should also be appreciated that data center 210 described in FIG. 2 is merely illustrative and that other implementations might be utilized. Additionally, it should be appreciated that the functionality disclosed herein might be implemented in software, hardware, or a combination of software and hardware. Other implementations should be apparent to those skilled in the art. It should also be appreciated that a server, gateway, or other computing device may comprise any combination of hardware or software that can interact and perform the described types of functionality, including without limitation desktop or other computers, database servers, network storage devices and other network devices, PDAs, tablets, cellphones, wireless phones, pagers, electronic organizers, Internet appliances, television-based systems (e.g., using set top boxes and/or personal/digital video recorders), and various other consumer products that include appropriate communication capabilities. In addition, the functionality provided by the illustrated modules may in some embodiments be combined in fewer modules or distributed in additional modules. Similarly, in some embodiments the functionality of some of the illustrated modules may not be provided and/or other additional functionality may be available.

The capacity of purchased computing resources provided by data center 210 can be scaled in response to demand. In this regard, scaling refers to the process of instantiating (which may also be referred to herein as "launching" or "creating") or terminating (which may also be referred to herein as "de-scaling") instances of computing resources in response to demand. In this manner, the capacity of resources purchased by a customer of data center 210 can be scaled on-demand.

Auto scaling is one mechanism for scaling computing resources in response to increases or lulls in demand for the resources. Auto scaling allows customers of data center 210 to configure data center 210 to scale their purchased computing resources according to conditions defined by the customer. For instance, rules may be defined for scaling up capacity in a particular manner in response to the occurrence of specified conditions, such as a spike in demand. Similarly, rules might also be defined to scale down capacity in a particular manner in response to the occurrence of other conditions, such as a lull in demand. The mechanisms disclosed herein for launching virtual machine instances might be utilized when instances are manually launched by a customer or when instances are launched by an auto scaling component in data center 210.

Data center 210 may also be configured with a deployment component to assist customers in the deployment of new instances of computing resources. The deployment component may receive a configuration from a customer that includes data describing how new instances should be configured. For example, the configuration might specify one or more applications or software components that should be installed in new instances, provide scripts, and/or other types of code to be executed in new instances, provide cache warming logic specifying how an application cache should be prepared, and other types of information. The deployment component utilizes the customer-provided configuration and cache warming logic to launch, configure, and prime new instances of computing resources.

Figure 3:
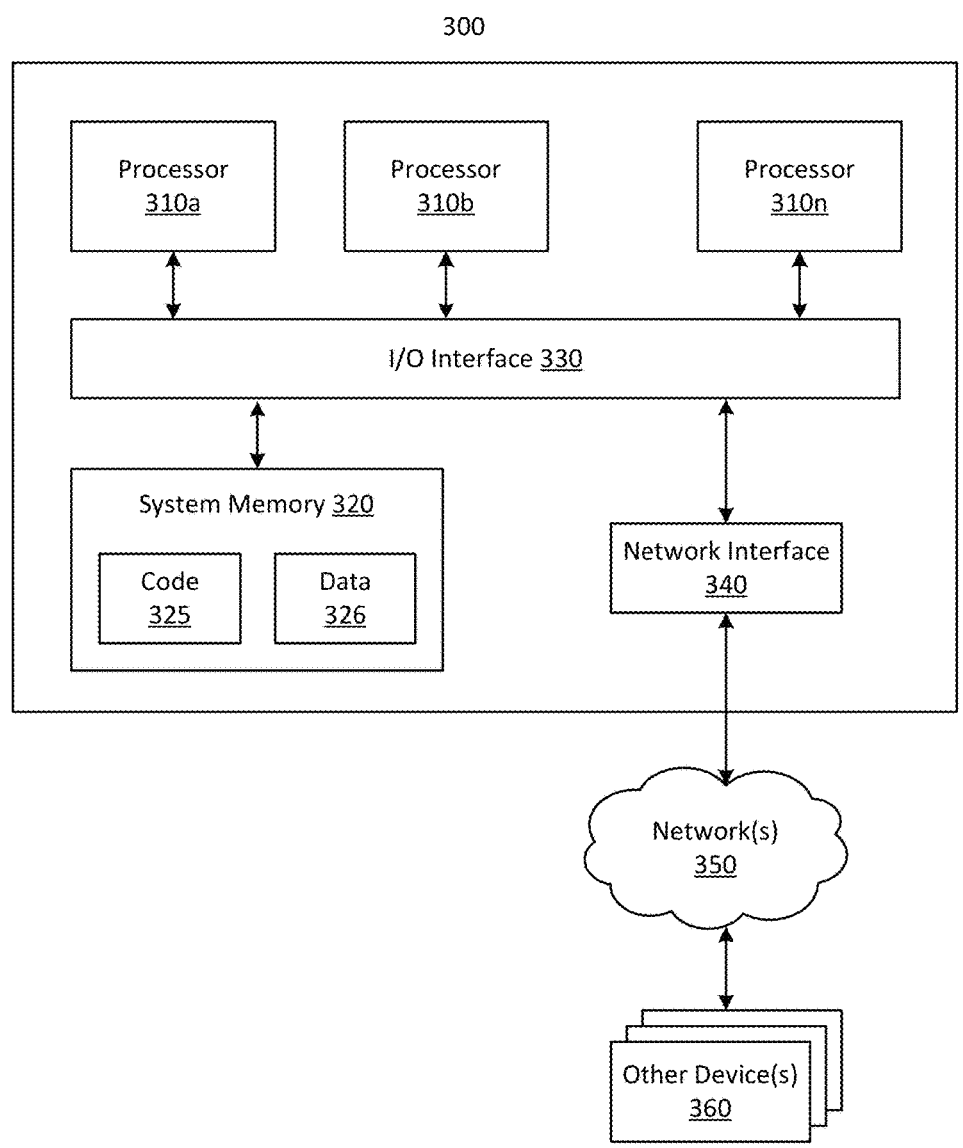
FIG. 3 is a diagram illustrating an example computing system that may be used in some embodiments.

In at least some embodiments, a server that implements a portion or all of one or more of the technologies described herein, including the techniques to implement the functionality of a resource analysis service 180 may include a general purpose computer system that includes or is configured to access one or more computer-accessible media. FIG. 3 illustrates such a general purpose computing device 300. In the illustrated embodiment, computing device 300 includes one or more processors 310*a*, 310*b*, and/or 310*n* (which may be referred herein singularly as "a processor 310" or in the plural as "the processors 310") coupled to a system memory 320 via an input/output (I/O) interface 330. Computing device 300 further includes a network interface 340 coupled to I/O interface 330.

In various embodiments, computing device 300 may be a uniprocessor system including one processor 310 or a multiprocessor system including several processors 310 (e.g., two, four, eight, or another suitable number). Processors 310 may be any suitable processors capable of executing instructions. For example, in various embodiments, processors 310 may be general purpose or embedded processors implementing any of a variety of instruction set architectures (ISAs), such as the x86, PowerPC, SPARC, or MIPS ISAs, or any other suitable ISA. In multiprocessor systems, each of processors 310 may commonly, but not necessarily, implement the same ISA.

System memory 320 may be configured to store instructions and data accessible by processor(s) 310. In various embodiments, system memory 320 may be implemented using any suitable memory technology, such as static random access memory (SRAM), synchronous dynamic RAM (SDRAM), nonvolatile/Flash-type memory, or any other type of memory. In the illustrated embodiment, program instructions and data implementing one or more desired functions, such as those methods, techniques, and data described above, are shown stored within system memory 320 as code 325 and data 326.

In one embodiment, I/O interface 330 may be configured to coordinate I/O traffic between processor 310, system memory 320, and any peripheral devices in the device, including network interface 340 or other peripheral interfaces. In some embodiments, I/O interface 330 may perform any necessary protocol, timing, or other data transformations to convert data signals from one component (e.g., system memory 320) into a format suitable for use by another component (e.g., processor 310). In some embodiments, I/O interface 330 may include support for devices attached through various types of peripheral buses, such as a variant of the Peripheral Component Interconnect (PCI) bus standard or the Universal Serial Bus (USB) standard, for example. In some embodiments, the function of I/O interface 330 may be split into two or more separate components, such as a north bridge and a south bridge, for example. Also, in some embodiments some or all of the functionality of I/O interface 330, such as an interface to system memory 320, may be incorporated directly into processor 310.

Network interface 340 may be configured to allow data to be exchanged between computing device 300 and other device or devices 360 attached to a network or network(s) 350, such as other computer systems or devices as illustrated in FIGS. 1 through 3, for example. In various embodiments, network interface 340 may support communication via any suitable wired or wireless general data networks, such as types of Ethernet networks, for example. Additionally, network interface 340 may support communication via telecommunications/telephony networks, such as analog voice networks or digital fiber communications networks, via storage area networks, such as Fibre Channel SANs or via any other suitable type of network and/or protocol.

In some embodiments, system memory 320 may be one embodiment of a computer-accessible medium configured to store program instructions and data as described above for FIGS. 1 and 2 for implementing embodiments of the corresponding methods and apparatus. However, in other embodiments, program instructions and/or data may be received, sent or stored upon different types of computer-accessible media. Generally speaking, a computer-accessible medium may include non-transitory storage media or memory media, such as magnetic or optical media, e.g., disk or DVD/CD coupled to computing device 300 via I/O interface 330. A non-transitory computer-accessible storage medium may also include any volatile or non-volatile media, such as RAM (e.g. SDRAM, DDR SDRAM, RDRAM, SRAM, etc.), ROM, etc., that may be included in some embodiments of computing device 300 as system memory 320 or another type of memory. Further, a computer-accessible medium may include transmission media or signals such as electrical, electromagnetic or digital signals, conveyed via a communication medium such as a network and/or a wireless link, such as may be implemented via network interface 340. Portions or all of multiple computing devices, such as those illustrated in FIG. 3, may be used to implement the described functionality in various embodiments; for example, software components running on a variety of different devices and servers may collaborate to provide the functionality. In some embodiments, portions of the described functionality may be implemented using storage devices, network devices, or special purpose computer systems, in addition to or instead of being implemented using general purpose computer systems. The term "computing device," as used herein, refers to at least all these types of devices and is not limited to these types of devices.

A network set up by an entity, such as a company or a public sector organization, to provide one or more services (such as various types of cloud-based computing or storage) accessible via the Internet and/or other networks to a distributed set of clients may be termed a provider network. Such a provider network may include numerous data centers hosting various resource pools, such as collections of physical and/or virtualized computer servers, storage devices, networking equipment, and the like, needed to implement and distribute the infrastructure and services offered by the provider network. The resources may in some embodiments be offered to clients in units called instances, such as virtual or physical computing instances or storage instances. A virtual computing instance may, for example, comprise one or more servers with a specified computational capacity (which may be specified by indicating the type and number of CPUs, the main memory size, and so on) and a specified software stack (e.g., a particular version of an operating system, which may in turn run on top of a hypervisor).

A number of different types of computing devices may be used singly or in combination to implement the resources of the provider network in different embodiments, including general purpose or special purpose computer servers, storage devices, network devices, and the like. In some embodiments a client or user may be provided direct access to a resource instance, e.g., by giving a user an administrator login and password. In other embodiments the provider network operator may allow clients to specify execution requirements for specified client applications and schedule execution of the applications on behalf of the client on execution platforms (such as application server instances, Java™ virtual machines (JVMs), general purpose or special purpose operating systems, platforms that support various interpreted or compiled programming languages, such as Ruby, Perl, Python, C, C++, and the like, or high-performance computing platforms) suitable for the applications, without, for example, requiring the client to access an instance or an execution platform directly. A given execution platform may utilize one or more resource instances in some implementations; in other implementations multiple execution platforms may be mapped to a single resource instance.

In many environments, operators of provider networks that implement different types of virtualized computing, storage, and/or other network-accessible functionality may allow customers to reserve or purchase access to resources in various resource acquisition modes. The computing resource provider may provide facilities for customers to select and launch the desired computing resources, deploy application components to the computing resources, and maintain an application executing in the environment. In addition, the computing resource provider may provide further facilities for the customer to quickly and easily scale up or scale down the numbers and types of resources allocated to the application, either manually or through automatic scaling, as demand for or capacity requirements of the application change. The computing resources provided by the computing resource provider may be made available in discrete units, which may be referred to as instances. An instance may represent a physical server hardware platform, a virtual machine instance executing on a server, or some combination of the two. Various types and configurations of instances may be made available, including different sizes of resources executing different operating systems (OS) and/or hypervisors and with various installed software applications, runtimes, and the like. Instances may further be available in specific availability zones, representing a data center or other geographic location of the underlying computing hardware, for example.

In some embodiments the provider network may be organized into a plurality of geographical regions, and each region may include one or more availability zones. An availability zone (which may also be referred to as an availability container) in turn may comprise one or more distinct locations or data centers, configured in such a way that the resources in a given availability zone may be isolated or insulated from failures in other availability zones. That is, a failure in one availability zone may not be expected to result in a failure in any other availability zone. Thus, the availability profile of a resource instance is intended to be independent of the availability profile of a resource instance in a different availability zone. Clients may be able to protect their applications from failures at a single location by launching multiple application instances in respective availability zones. At the same time, in some implementations, inexpensive and low latency network connectivity may be provided between resource instances that reside within the same geographical region (and network transmissions between resources of the same availability zone may be even faster).

The provider network may make instances available "on-demand," allowing a customer to select a number of instances of a specific type and configuration (e.g. size, platform, tenancy, availability zone, and the like) and quickly launch the instances for deployment. On-demand instances may further be added or removed as needed, either manually or automatically through auto scaling, as demand for or capacity requirements changes over time. The customer may incur ongoing usage costs related to their on-demand instances, based on the number of hours of operation and/or the actual resources utilized, for example.

The computing resource provider may also make reserved instances available to the customer. Reserved instances may provide the customer with the ability to reserve a number of a specific type and configuration of instances for a fixed term, such as one year or three years, for a low, upfront cost in exchange for reduced hourly or other usage costs, for example, if and when the instances are launched. This may allow the customer to defer costs related to scaling up the deployed application in response to increase in demand, while ensuring that the right resources will be available when needed. While reserved instances provide customers with reliable, stand-by capacity for scaling of their application, purchasing reserved instances may also lock the customer into a specific number, type, and/or configuration of computing resource in a specific availability zone for a longer period than desired. If the technical architecture or needs of the application change, the customer may not be able to realize a return on the customer's investment in the reserved instances.

Operators of such provider networks may in some instances implement a flexible set of resource reservation, control, and access interfaces for their clients. For example, a resource manager of the provider network may implement a programmatic resource reservation interface (e.g., via a web site or a set of web pages) that allows clients to learn about, select, purchase access to and/or reserve resource instances. In some embodiments discussed below where an entity, such as a resource manager or a pricing optimizer, is described as implementing one or more programmatic interfaces, such as a web page or an API, an interface manager subcomponent of that entity may be responsible for the interface-related functionality. In many embodiments equivalent interface-related functionality may be implemented by a separate or standalone interface manager, external to the resource manager and the pricing optimizer. Such an interface may include capabilities to allow browsing of a resource catalog and details and specifications of the different types or sizes of resources supported and the different reservation types or modes supported, pricing models, and so on.

The provider network may support several different purchasing modes (which may also be referred to herein as reservation modes) corresponding to some of the instance types described above. For example, the provider network may support long-term reservations, on-demand resource allocations, or spot-price-based resource allocations. Using the long-term reservation mode, a client may make a low, one-time, upfront payment for a resource instance, reserve it for a specified duration, such as a one- or three-year term, and pay a low hourly rate for the instance; the client would be assured of having the reserved instance available for the term of the reservation. Using the on-demand mode, a client could pay for capacity by the hour (or some appropriate time unit), without any long-term commitments or upfront payments. In the spot-price mode, a client could specify the maximum price per unit of time that it is willing to pay for a particular type of resource, and if the client's maximum price exceeded a dynamic spot price determined at least in part by supply and demand, then that type of resource would be provided to the client. In some embodiments, dynamically resizable pools of resource instances may be set aside for the different reservation types or modes—e.g., long-term reserved instances may be allocated from one pool, on-demand instances from another, and so on. During periods when the supply of the requested resource type exceeded the demand, the spot price may become significantly lower than the price for the on-demand mode. In some implementations, if the spot price increases beyond the maximum bid specified by a client, a resource allocation may be interrupted—i.e., a resource instance that was previously allocated to the client may be reclaimed by the resource manager and may be allocated to some other client that is willing to pay a higher price. Other purchasing modes or combinations of modes may be implemented by the resource manager in some embodiments.

Figure 4:
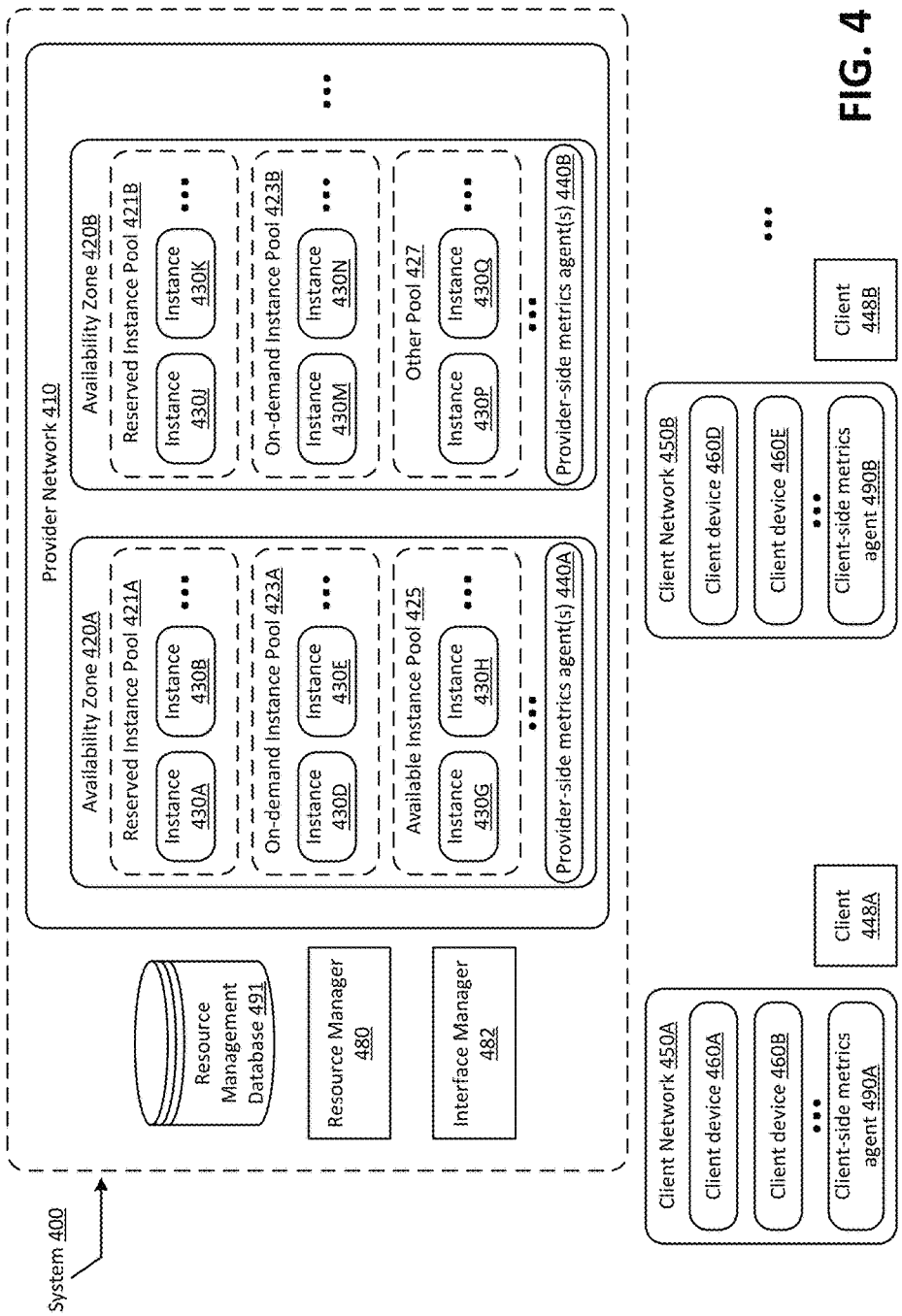
FIG. 4 is a diagram illustrating a system for providing computing resources in accordance with the present disclosure.

FIG. 4 illustrates an example system environment for providing instances, according to at least some embodiments. The system 400 may include a provider network 410 comprising a plurality of resource instances 430 (which may be referred herein singularly as "a resource instance 430" or in the plural as "the resource instances 430"), such as instances 430A, 430B, 430D, 430E, 430G, and 430H in one availability zone 420A and instances 430J, 430K, 430M, 430N, 430P, and 430Q in a different availability zone 420B. The various resource instances 430 in the availability zones 420A and 420B (which may be referred herein singularly as "an availability zone 420" or in the plural as "the availability zones 420") may be reserved and/or allocated for use by clients (or potential clients), such as client 448A and 448B (which may be referred herein singularly as "a client 448" or in the plural as "the clients 448"). In the illustrated embodiment, system 400 includes a resource manager 480 and an interface manager 482. As noted earlier, in some embodiments the functionality of the interface manager 482 may be implemented by a subcomponent of the resource manager 480.

The interface manager 482 may in some embodiments implement one or more programmatic interfaces allowing clients 448 to search for, browse, reserve, and acquire instances 430 to obtain various types of services, e.g., to run and/or access various applications. In the illustrated embodiment, at a given point in time, some or all of the instances 430 may be assigned to instance pools, such as reserved instance pools 421A or 421B, on-demand instance pools 423A or 423B, available instance pool 425, or other pools, such as other pool 427.

In some embodiments a given pool, such as available instance pool 425, may itself contain its own sub-pools, e.g., based on the modes of instance reservation and allocation supported. Each pool (or sub-pool) may have an associated pricing policy for its instances, as well as other properties, such as interruptibility settings, for the instances that happen to be assigned to the pool or sub-pool. The pools may represent logical collections or aggregations, so that, for example, the presence of two instances in the same pool or sub-pool may not necessarily imply anything about the physical location of the hardware used for the two instances. Although the instances 430 illustrated in FIG. 4 are shown as belonging to availability zones 420, in other embodiments the provider network 410 may be organized differently, e.g., in some embodiments availability zones 420 may not be implemented. Availability zones 420 may be grouped into geographic regions (not shown in FIG. 4) in some embodiments. Instance pools may be implemented within availability zones in some implementations (e.g., each availability zone may have its own reserved instance pool); while in other implementations an instance pool or sub-pool may span multiple availability zones.

Figure 5:
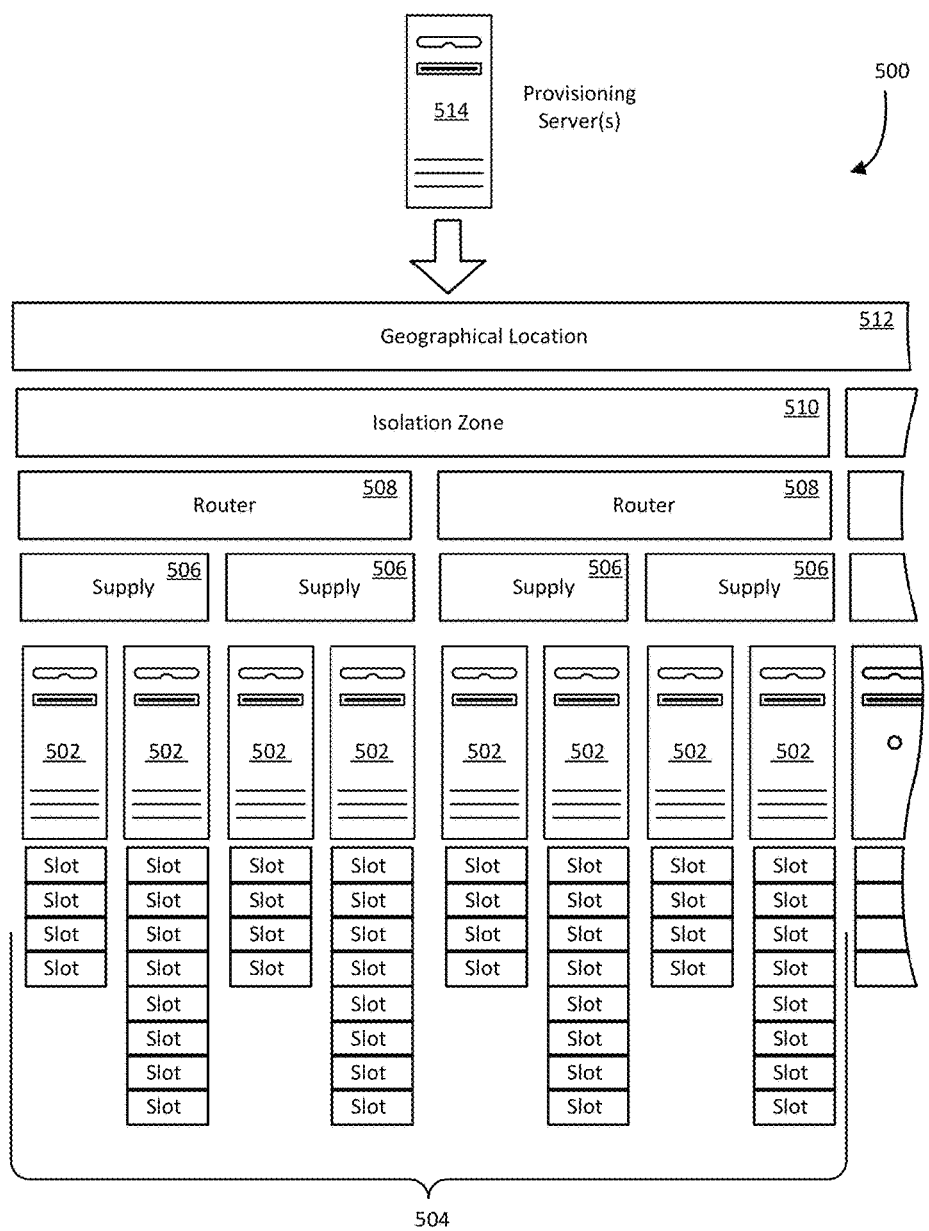
FIG. 5 is a diagram illustrating a mechanism for providing computing resources in accordance with the present disclosure.

In some embodiments, such as in FIG. 5, a data center 500 may be viewed as a collection of shared computing resources and/or shared infrastructure. For example, as shown in FIG. 5, a data center 500 may include virtual machine slots 504, physical hosts 502, power supplies 506, routers 508, isolation zone 510, and geographical location 512. A virtual machine slot 504 may be referred to as a slot or as a resource slot. A physical host 502 may be shared by multiple virtual machine slots 504, each slot 504 being capable of hosting a virtual machine, such as a guest domain. Multiple physical hosts 502 may share a power supply 506, such as a power supply 506 provided on a server rack. A router 508 may service multiple physical hosts 502 across several power supplies 506 to route network traffic. An isolation zone 510 may service many routers 508, the isolation zone 510 being a group of computing resources that may be serviced by redundant resources, such as a backup generator. Isolation zone 510 may reside at a geographical location 512, such as a data center 500. A provisioning server 514 may include a memory and processor configured with instructions to analyze user data and rank available implementation resources using determined roles and shared resources/infrastructure in the calculation. The provisioning server 514 may also manage workflows for provisioning and deprovisioning computing resources as well as detecting health and/or failure of computing resources.

A provisioning server 514 may determine a placement of the resource within the data center. In some embodiments, this placement may be based at least in part on available computing resources and/or relationships between computing resources. In one embodiment, the distance between resources may be measured by the degree of shared resources. This distance may be used in the ranking of resources according to role. For example, a first system on a host 502 that shares a router 508 with a second system may be more proximate to the second system than to a third system only sharing an isolation zone 510. Depending on an application, it may be desirable to keep the distance low to increase throughput or high to increase durability. In another embodiment, the distance may be defined in terms of unshared resources. For example, two slots 504 sharing a router 508 may have a distance of a physical host 502 and a power supply 506. Each difference in resources may be weighted differently in a distance calculation.

A placement calculation may also be used when selecting a prepared resource to transfer to a client account. In one embodiment, a client requests a virtual machine having an operating system. The provisioning server 514 may determine that the request may be satisfied with a staged volume in a slot 504. A placement decision may be made that determines which infrastructure may be desirable to share and which infrastructure is undesirable to share. Using the placement decision, a staged volume that satisfies at least some of the placement decision characteristics may be selected from a pool of available resources. For example, a pool of staged volumes may be used in a cluster computing setup. When a new volume is requested, a provisioning server 514 may determine that a placement near other existing volumes is desirable for latency concerns. Therefore, the decision may find that sharing a router 508 is desirable but sharing a supply 506 and physical host 502 is undesirable. A volume in the pool may then be selected that matches these attributes and placed preferably on a same router 508 as the other volumes but not the same physical host 502 or power supply 506. In other examples of placement decisions, such as those relating to a database shard, sharing of infrastructure may be less desirable and a volume may be selected that has less infrastructure in common with other related volumes.

Operators of provider networks, such as those described above, may, in some embodiments, provide an infrastructure, such as resource analysis service 180 depicted in FIG. 1 configured to provide customers with the ability to manage recommendations and templates pertaining to the customers' allocated resources.

Many computing environments, such as a web services platform, are large and complex and can include a vast number of interconnected devices with a mix of various types of data flowing through both virtual and physical components. Computing devices, such as servers and routers, may have complex interactions, and behaviors in one area can affect the performance of the entire computing environment. Metrics (may also be referred to as benchmarks) may include performance metrics that indicate how various resources in the computing environment are performing. As discussed above, performance metrics are useful for allowing customers as well as the service provider to plan and utilize resources. Such performance metrics may include, for example, memory usage or error rates. In many cases customers may have hundreds or thousands of instances, and it may be difficult for a customer to view metrics for the instances and identify potential issues related to specific metrics.

A service, such as resource analysis service 180, may be configured to provide real-time or accumulated and/or archived monitoring of a customer's resources. The monitored resources may include instances of various types, such as reserved instances and spot instances as discussed above. The monitored resources may also include other computing resources provided by the service provider, such as storage services and database services. The resource analysis service 180 may provide metrics, such as CPU utilization, data transfers, and disk usage activity. The resource analysis service 180 may be made accessible via an API or a user interface that may be accessed via a web browser or other input mechanisms.

In some embodiments, resource analysis service 180 may include a resource advisor component to provide recommended practices. The recommendations may be based on analysis of metrics associated with a customer as well as the service provider's aggregated operational history. The resource advisor component may inspect a customer's allocated computing resources and generate recommendations that may, if implemented, provide improvements to overall system performance, close security gaps, or provide other improvements and benefits.

In some embodiments, the resource advisor component of resource analysis service 180 may provide recommended architectures and configurations based on priorities and requirements provided by the customer. The recommendations may be based on an analysis of the customer's priorities and requirements as well as best practices and other information accessible by the service provider.

In some implementations, the resource advisor component may include a cost optimization function that may generate recommendations for cost savings by eliminating unused and idle resources. The cost optimization function may, for example, analyze a customer's computing resource fees and calculate an optimal quantity of computing resources for each resource type in each region and availability zone. Recommendations may be based, for example, on usage data over a predetermined time period.

In one example, the resource advisor component may review the average CPU utilization of a customer's instances that were running at any time during a predetermined time period. CPU utilization may be calculated when the customer's instance is in a running state. The resource advisor component may determine efficiencies that can be gained by adjusting when instances are run and the size of the instances. An estimate of potential savings may be calculated using current on-demand instance usage rates multiplied by the expected amount of time that the instance will be underutilized. The resource advisor component may also, for example, examine storage volume configurations and determine if a customer's storage volumes appear to be underutilized. The resource advisor component may examine other resources in a similar fashion.

In some implementations, the resource advisor component may include a security optimization function that may generate recommendations for improving aspects of security for a customer's resources by, for example, identifying security gaps, enabling security features, and examining permissions. The security optimization function may inspect, for example, a customer's security groups for rules that have errors, which might allow more access than may be intended and thus increase opportunities for malicious activity.

In some implementations, the resource advisor component may include a fault tolerance function that may generate recommendations for improving fault tolerance capabilities. The fault tolerance function may, for example, generate recommendations for increasing the availability and redundancy of a customer's resources by incorporating auto scaling, health checks, multiple availability zones, backup capabilities, etc. By analyzing a customer's resource distribution across availability zones, the customer's data and applications may be better insulated from failures. As another example, the fault tolerance function may evaluate a customer's storage volumes and determine durability risks caused by concurrent hardware failures of multiple components. The fault tolerance function may check for redundancies in case of outages or planned maintenance, and evaluate the availability of resources to handle increased usage during demand spikes. The fault tolerance function may also determine if automated backups are enabled to reduce the risk of unexpected data loss and allow for point-in-time recovery.

In some implementations, the resource advisor component may include a performance optimization function that may generate recommendations for increasing the performance of a customer's resources. The performance optimization function may identify recommendations for improving performance by, for example, checking service limits, ensuring that provisioned throughput is being utilized, and monitoring for over-utilized resources. For example, the performance optimization function may analyze average daily CPU utilization for a customer's instances and flag instances that are potentially over-utilized. Consistently high utilization rates can indicate that an application is under-resourced. The performance optimization function may also inspect a customer's storage volumes that are potentially overutilized and that may benefit from a more efficient configuration. For example, the performance optimization function may determine if a storage volume is suitable for applications with moderate or bursty I/O requirements based on the Input/Output Operations Per Second (IOPS) rate.

The resource advisor component may provide other optimization functions for generating recommendations pertaining to other desired attributes such as certification and support requirements and industry standards.

In some embodiments, resource analysis service 180 may include a template management component to provide and manage templates that can be used by customers of the provider network. Templates may be used as configuration starting points by customers to create and manage a collection of related resources and provision and update the resources in an orderly and predictable fashion. The template management component may also include a template creation tool so that a customer may use preformatted templates or create the customer's own templates to describe resources and any associated dependencies or runtime parameters. As used herein, a collection of resources associated with a template may be referred to as a stack. Furthermore, a template may also be referred to as a configuration or a predetermined configuration.

By using templates to create identical copies of the same stack or as a foundation for starting a new stack, customers may provision resources predictably and repeatedly without spending considerable effort creating and configuring the underlying infrastructure associated with their resources. Furthermore, the customers may use the templates as is or use the templates as a starting point for creating the customer's own templates.

In one embodiment, the template management component may provide a user interface to allow customers to select resources, configuration values, interconnections, and other parameters. The template management component may, based on the inputs, generate a template corresponding to the requested parameters. By allowing a customer to select the parameters, customers can customize aspects of a template at runtime when the stack is constructed. For example, the customer may determine a database size, instance type, and webserver port numbers when a stack is created. A customer may also use a parameterized template to create multiple stacks that may differ in a controlled way. For example, the customer's instance types may differ between geographic regions.

In one embodiment, a customer may be provided a user interface for creating a template. The customer may select or create a template that defines a stack to provision one or more resources. For example, the customer may select a template that the customer wants to use. The user interface may provide sample templates for popular applications that the customer can deploy to get started. For example, sample templates may be provided that can show a customer how to interconnect and use multiple resources in consideration of geographic redundancy and scaling. A customer may also load the customer's own custom templates that may have been previously created and stored using service provider storage or the customer's own storage. The customer may customize a stack by overriding template parameters (such as database or application usernames, passwords, port numbers, instance types, etc.), or the customer may accept the default values supplied by the template. The template management component may provision the resources and create the stack.

The template management component may allow a customer to create a template from the customer's existing resources. A customer may, for example, provision and configure the customer's resources and use the template management component to take a snapshot of the customer's configuration to create a template. The customer may then instantiate resources using the created template. The instantiation of the resources may be performed based at least in part on launching copies of the configuration using the template management component.

The template management component may allow a customer to request a template for a recommended architecture based on the customer's priorities and requirements. A customer may, for example, provide priorities and requirements for a new computing resource. The resource advisor component may analyze the priorities and requirements and, based on best practices and other information, the resource advisor component may generate one or more recommended architectures. The recommended architectures may be prioritized and ranked based on the customer's priorities or other criteria. The customer may select one of the recommended architectures or configurations for generation of a template. The customer may then instantiate resources using the template management component to launch the selected architecture or configuration.

Templates may be implemented as text files or any other file that includes a declaration describing a collection (i.e., stack) of resources that a customer may want to deploy as a group. In one embodiment, a template may be stored as a text file in a format that complies with the JavaScript Object Notation (JSON) standard. In the JSON format, an object may be declared as a name-value pair or a pairing of a name with a set of child objects. Templates may thus also be referred to as a template file.

In some embodiments, the resource analysis service 180 may provide the ability for customers of a provider network to create templates based on recommendations generated by the resource advisor component. Customers may use resource advisor component recommendations to improve their resource configurations and then create templates using the template management component. Additionally, the customer may modify the created templates as described above.

In one embodiment, the resource advisor component of the resource analysis service 180 may provide one or more recommendations, and the customer may be provided an option to select a recommendation and implement the recommendation. In some cases the customer may wish to implement the recommendation to evaluate the results of incorporating the recommendation verify that the associated improvements are realized. The customer may then request generation of a template based on the incorporated recommendation. In other embodiments, the customer may request conversion of the generated recommendation into a template without first implementing the recommendation. The customer may modify the template if desired, and then use the template to launch one or more resources.

In response to a request to generate a template based on a recommendation, the resource analysis service 180 may obtain information regarding the customer's current configuration that is the subject of the selected recommendation. Taking this configuration as a starting point, the resource analysis service 180 may adjust the configuration information and make adjustments in accordance with the recommendation. For example, a template may be generated for launching a single computing instance using a relational database instance for storage and incorporating a recommended instance type with a recommended security group.

In order to allow for analysis to generate recommendations for a customer, the resource analysis service 180 may monitor metrics automatically and the service provider may store monitored metric data for analysis by the resource advisor component. For example, the service provider may collect metadata for a number of pre-selected metrics at a predetermined frequency. Additional metrics may be provided at the same or different frequencies as determined by the service provider. It should be understood that the metrics may be provided for any of the computing resources provided by the service provider including load balancers, databases, storage, and the like. The resource analysis service 180 may monitor load balancers for metrics, such as request count and latency, or storage resources for metrics, such as read/write latency, free-able memory, and available storage space. The resource analysis service 180 may also monitor metrics generated by the customer's applications. For example, a customer may send metrics of interest to the service provider via an API.

In some embodiments, the API may be facilitate requests for generating recommendations and templates. For example, the API can be called with information such as a resource identifier, resource configuration, and applications. After the API is called, in one embodiment the resource analysis service 180 may take actions such as:

Invoke a detection function to generate a baseline of available metrics pertaining to the resource analysis and individual customer resources to determine if there are any metrics that indicate behavior outside of one or more trends.

Access activity logs for the customer's resources.

Retrieve configuration of the customer's resources.

Retrieve connection states for the customer's resources.

Call available APIs that can provide metrics for the customer's resources.

Using the gathered information, the resource analysis service 180 may analyze the data, combine or aggregate the data or extract portions of the data as appropriate, and compare against signature patterns to determine potential recommendations and templates. The signature patterns may be predefined and can be made available in modules or scripts. The identified recommendations and templates may be reported through the API along with details about the recommendations and templates.

In one embodiment, the customer may provide requirements and priorities pertaining to the intended use for the customer's requested computing resources. The resource analysis service 180 may generate one or more architectures or configurations based on the customer's requirements and priorities. The resource analysis service 180 may further generate one or more templates based on the architectures or configurations. The architectures or configurations may be generated using best practices and other information described herein. When the customer selects architecture or configuration, a template may be for the selected architecture or configuration and the generated template may be used to deploy the customer's resources in accordance with the template. In some embodiments, the architectures or configurations may be prioritized and ranked based on one or more criteria. For example, a customer may select one or more best practices as a priority for the customer's requirements. The selected priorities may be analyzed to generate one or more architectures or configurations. In one embodiment, the priorities may be merged to determine a methodology for determining an architecture or configuration that meets the customer's requirements. The merged priorities may also be used to rank the architectures or configurations. The ranked architectures or configurations may be provided to the customer for review and selection. In response to selection of one of the ranked architectures or configurations, a template may be generated based on the selected architecture or configuration.

Examples of priorities may include security, cost, and certification requirements. A customer may select one or more priorities and their relative ranking. In some embodiments, the priorities may have a default ranking if the customer does not rank the priorities. In response to the selection of priorities, the resource analysis service 180 may combine the priorities if multiple priorities have been selected. If two or more priorities are in conflict, the conflict can be resolved using a conflict resolution algorithm. The conflict resolution algorithm may, for example, review the rankings of the priorities and resolve conflicts by allowing the higher ranking to override a lower ranking. A conflicting priority that is outranked by a higher ranked priority may be flagged and a notification may be provided to the customer that a requested priority is in conflict with another priority and may not be incorporated in the recommendation.

The priorities that have not been conflicted and outranked may be analyzed and one or more architectures or configurations may be generated in consideration of the ranked priorities. The architectures or configurations may be determined in a number of ways. An architecture or configuration may be determined based on a combination of priorities that have not been conflicted and outranked. Additional architectures or configurations may be determined using one or more scenarios where each of the customer's selected priorities are assumed to be the highest rank. The architectures or configurations can then be provided to the customer so that the customer can review the proposed architectures or configurations and their rankings relative to the customer's selected priorities.

Figure 6:
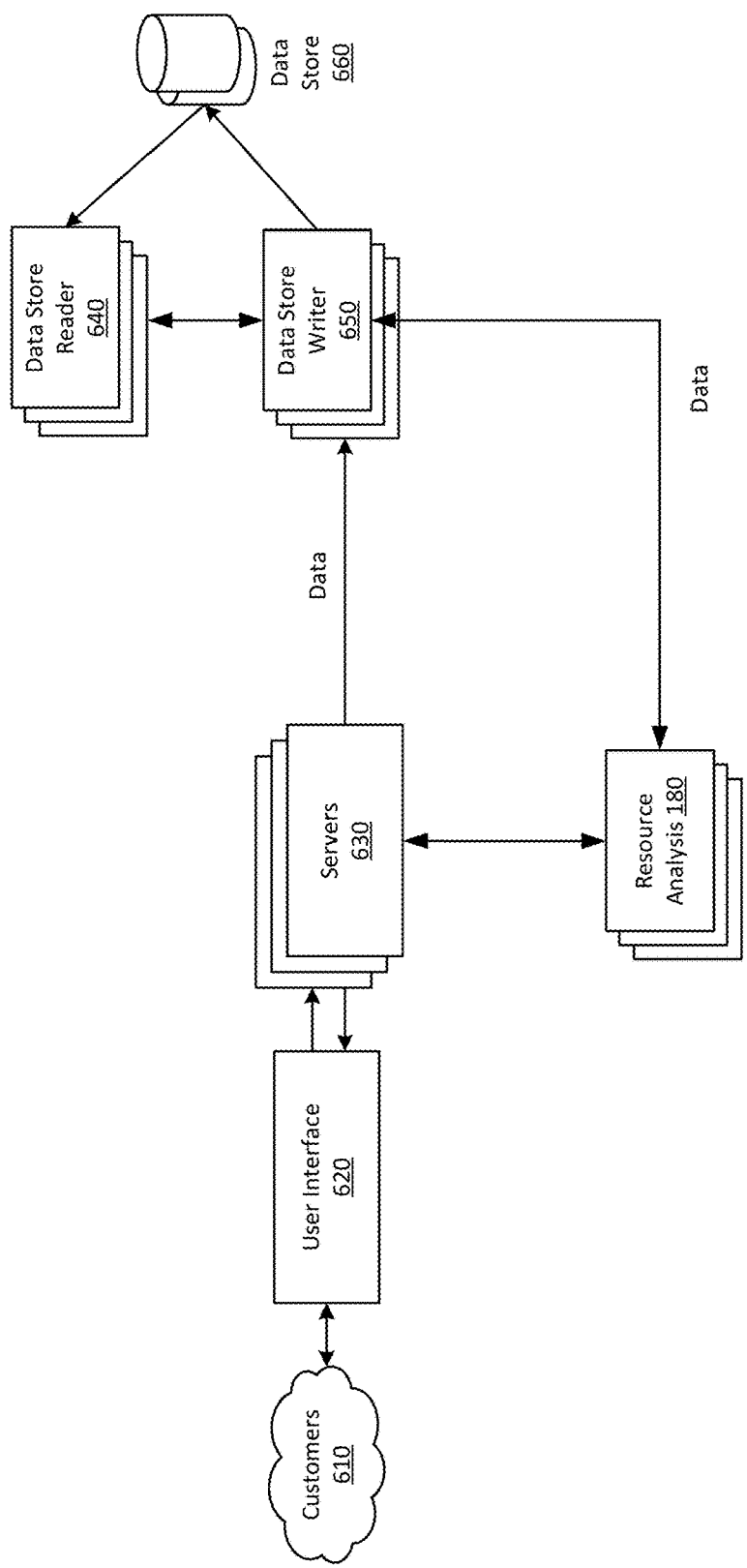
FIG. 6 is a diagram illustrating an example of providing resource analysis in accordance with the present disclosure.

Referring to FIG. 6, illustrated is one example implementation of functionality associated with the resource analysis service 180. The resource analysis service 180 may access or cause access to various measurements and generate or cause the generation of metrics. Customers 610 of the service provider may access a user interface 620 for viewing status and requesting analysis and templates. In some embodiments, the user interface 620 can be generated by functions implemented in software executing on one or more of the service provider's servers 630. Performance or metric data associated with customer 610 may be provided to a data store writer 650 that may store the data. A data store reader 640 may be configured to access the data store 660 and retrieve data based on requests from resource analysis service 180 or for other purposes.

Figure 7A:
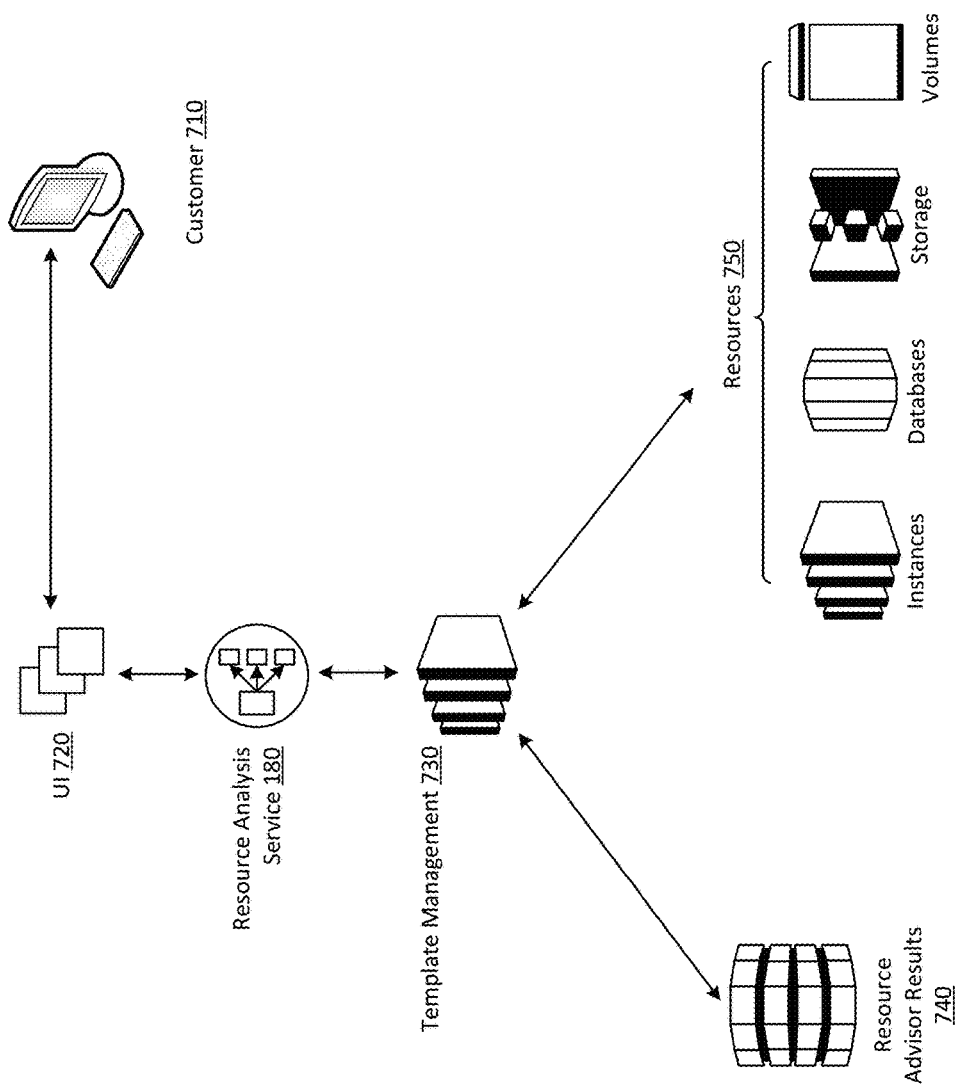
FIGS. 7A, 7B, and 7C are diagrams illustrating examples of providing resource analysis in accordance with the present disclosure.

Referring to FIG. 7A, illustrated is another example of requesting resource analysis and templates in accordance with this disclosure. Referring to FIG. 7A, a customer 710 may access a user interface 720 depicting services related to a selected item of interest related to resource analysis (e.g., a template in this example). A user interface may be generated that depicts a representation of a template selected by the customer 710. Additional user interfaces may be provided based on requests from the customer for additional data. The user interface 720, as well as other user interfaces that may be used to present resource analysis information to a user, may in some embodiments be generated by the service provider and sent to the user's display for rendering. In other embodiments, the user's computing device may include functionality to generate some or all portions of the user interface. For example, the user's web browser may include code for generating some of the graphics for rendering data received from the service provider. The service provider may receive the selection information from the user's computing device and provide the requested information. The user interface 720 may be generated or caused to be generated by resource analysis service 180.

Resource analysis service 180 may interact with a template management component 730. The template management component 730 may access resource advisor results 740 generated by a resource advisor component to generate one or more templates. The templates may be used to configure resources 750.

Figure 7B:
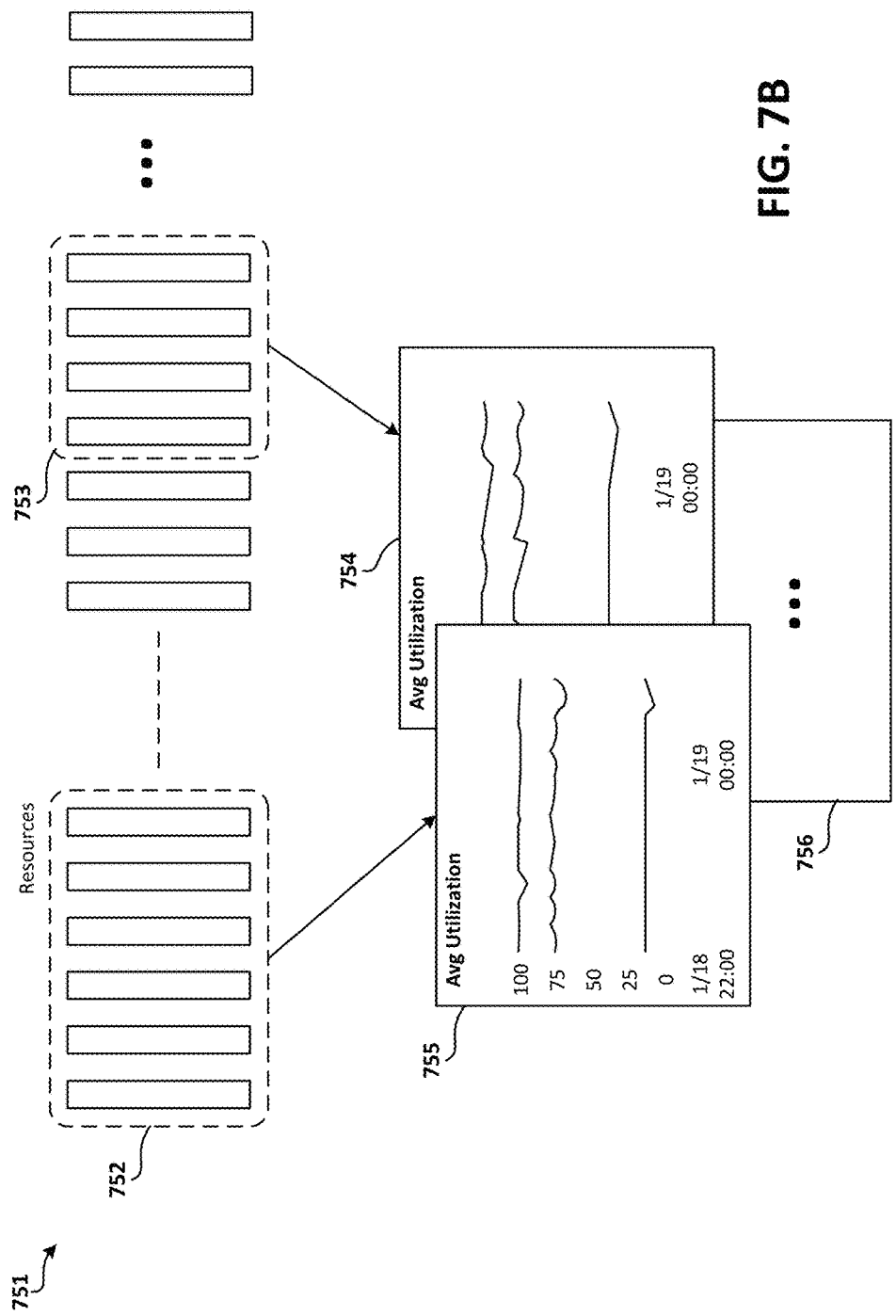

Referring to FIG. 7B, illustrated is an example of providing computing resources in accordance with this disclosure. Referring to FIG. 7B, the resource analysis service 180 may allocate a number of resources 752 to a customer. The resource analysis service 180 may request metrics for the customer's computing resources 752. The resource analysis service 180 may select a test or baseline group of the computing resources 753 for comparison. Metrics may be collected from the resources 752 to generate a first set of analyzed data 754. Metrics may be collected and analyzed from the test or baseline group to generate a second set of analyzed data 755 for comparison and identification of recommendations. Additional sets of analyzed data 756 may be generated as needed to identify recommendations.

Figure 7C:
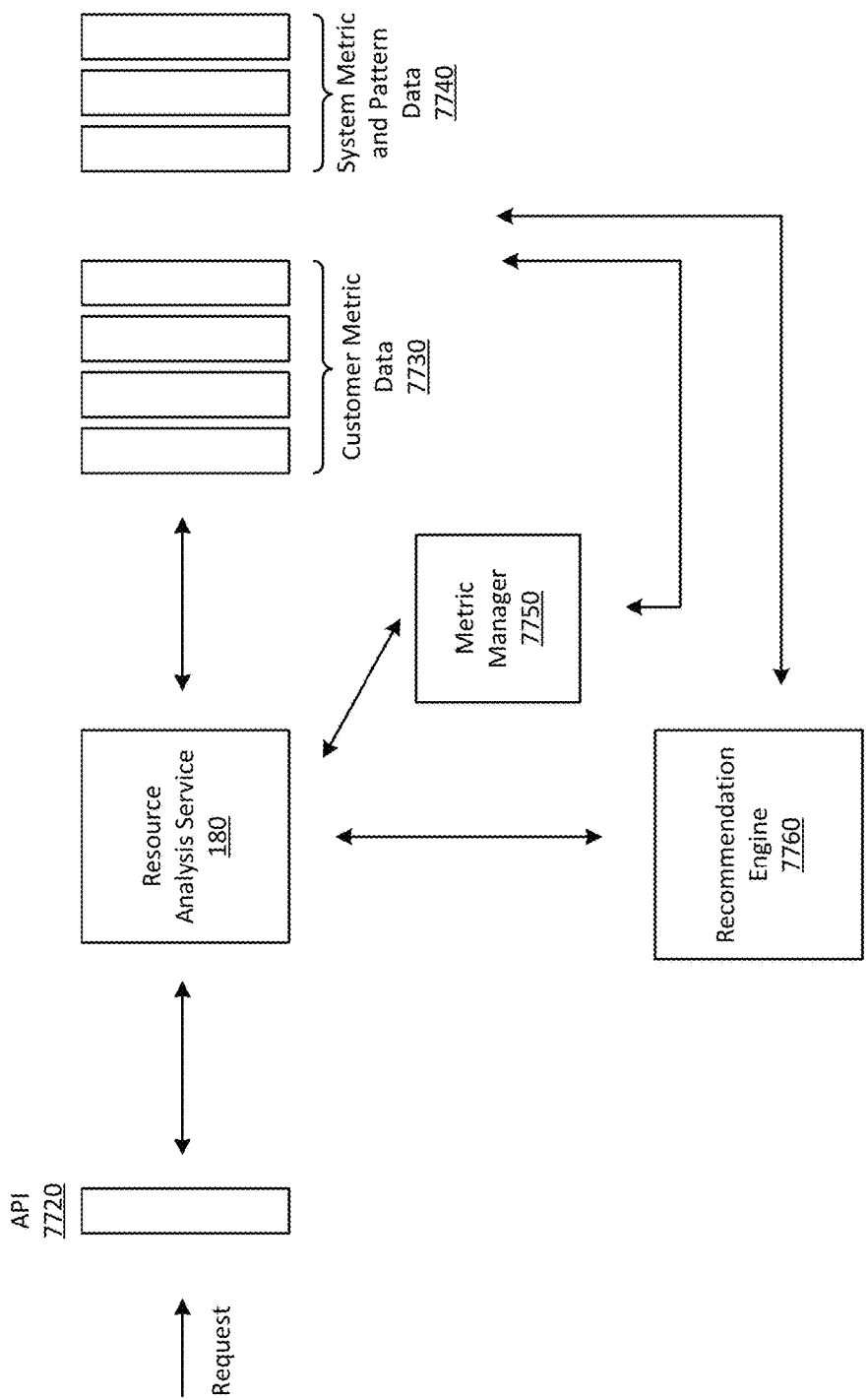

Referring to FIG. 7C, illustrated is an example of analyzing resources in accordance with this disclosure. Referring to FIG. 7C, a provider network may implement an API 7720 that is configured to receive requests for recommendations and templates. Requests may be managed by resource analysis service 180 that may communicate with one or more systems in the provider network to access customer metric data 7730 and system metric data 7770.

Resource analysis service 180 may also interact with metric manager 7750 and load balancer 7760 to analyze the customer metric data 7730 and system metric and pattern data 7740 and determine problems and problem sources. Load balancer 7760 may analyze various parameters such as input/output operations, reads/writes, CPU utilization, memory usage, and the like. Based on the analysis, resource analysis service 180 may identify recommendations and/or templates that can be provided to the customer.

In some embodiments, the resource analysis service 180 may monitor metrics automatically and the service provider may store monitored metric data for analysis. For example, the service provider may collect metadata for a number of pre-selected metrics at a predetermined frequency. Additional metrics may be provided at the same or different frequencies as determined by the service provider. It should be understood that the metrics may be provided for any of the computing resources provided by the service provider including load balancers, databases, storage, and the like. The resource analysis service 180 may monitor load balancers for metrics, such as request count and latency, or storage resources for metrics, such as read/write latency, free-able memory, and available storage space. The load balancer diagnostics service 180 may also monitor metrics generated by the customer's applications. A number of graphic indicators of metrics may be provided, such as tabular data and graphs.

A customer's resources may have various properties, such as the software image that is running on them, the availability zone where the resource is located, the number of CPUs, the CPU speed, the available RAM, etc. When analyzing the metrics for a group of resources on a user interface, the resource analysis service 180 may identify some resources or parameters that exhibit a distinctive profile that may be distinguishable from the other resources or parameters. For example, a group of instances may exhibit particularly poor performance with respect to one metric. The resource analysis service 180 may automatically cause analysis of these instances and provide a listing of parameters that indicate a possible cause for the distinctive profile area as compared to other instances that are not exhibiting the distinctive profile. The listing of parameters may be ranked in order of relevance to the metric of interest. The parameters may include any properties, settings, or characteristics of the instances or resources of the service provider that can be tracked or recorded.

In some embodiments, candidates for potential recommendations and templates can be selected based on biasing to influence the selection. For example, data for an initial set of recommendations and templates can be weighted to indicate relevance of the potential recommendations and templates to the metrics. The weighting can be continuously updated to increase the likelihood of optimizing around the metrics. In an embodiment, the metadata can indicate biasing with respect to various properties. Biasing can indicate, for example, that some parameters are only relevant to certain properties while having no impact on other properties. The biasing can also be used to eliminate some properties from consideration. For example, in some cases the relevance of a particular property may be zero, indicating that property is non-distinguishing for a given metric of interest. In this case a zero weight can be used to indicate that a particular property is unlikely to influence a given metric, thus reducing the potential scope of the analysis.

It should be understood that the use of weights is one example implementation of a way to determine properties relevant to analysis of a metric of interest. Other methods and algorithms may be used. Some embodiments will assign a higher weight to properties that are more relevant to the analyzed resources. Furthermore, the weights may be increased when the relevant properties are different for other resources. It should also be understood that although the embodiments described herein are illustrated in the context of virtual machine instances, the principles may be applied to computing resources as well as other types of data. For example, as described elsewhere, computing resources may include storage and database resources. Furthermore, any other type of data may be selected for analysis and determination of diagnostic issues.

The resource analysis service 180 may be configured to determine which properties are relevant for data collection or analysis. In some embodiments, the resource analysis service 180 may implement a pattern classification system to identify relevant parameters. For example, the resource analysis service 180 may include a learning system that may include a learning function to continuously learn which properties are relevant to a particular metric or diagnostic issue. In some embodiments, supervised learning may be incorporated where administrators of the service provider may classify observations made from a particular performance metric and their associated parameters, and assign tags to the parameters. The tags may be updated by the learning system to update relevance to the metric of interest as new observations are made and assigned tags to the new observations. In other embodiments, the resource analysis service 180 may learn which observations are alike and assign similar tags to these observations. The learning system may then classify future observations into categories of tags that may be created from the original observations.

In some embodiments, an algorithm, such as a selection algorithm or an induction algorithm, may be implemented to define groups or categories of metrics. Probabilistic approaches, such as Bayesian inferencing, may also be incorporated. Generally, some type of estimation may be incorporated, such as a parametric classification technique. In various embodiments, the resource analysis service 180 may employ probabilistic methods to guide and narrow the parameters that are analyzed. In order to provide relevant results that are more likely to indicate causes for a particular observed behavior, the most relevant parameters should be identified and weighted. However, the complexity of a computing environment with hundreds or thousands of networked devices may preclude a deterministic or exhaustive solution. In some embodiments a heuristic model can be used to find satisfactory solutions that provide an acceptable confidence level in the results. For example, experience-based techniques, such as expert modeling can be used to aid in the initial selection of parameters. The heuristic model can probabilistically indicate parameters of likely impact through, for example, tagging various metadata related to a particular metric. Feedback from an initial round of analysis can be used to further refine the initial selection, thus implementing a closed loop system that generates likely candidates in situations where programmatic approaches may be impractical or infeasible. As an example, Markov modeling or variations thereof (e.g., hidden Markov model and hierarchical hidden Markov model) can be used in some embodiments to identify solutions that may otherwise be missed using traditional methods. Monte Carlo methods, finite element analysis, and computational fluid analysis can also be used to generate results in various embodiments.

The results of the analysis may take any number of forms. In one embodiment, the results may be presented as a list of potential parameters of interest. The list may be ordered in increasing or decreasing fashion based on potential relevance. The resource analysis service 180 may provide a recommendation to the customer based on the analysis. For example, the recommendation may identify a potential change to the customer's configuration for the selected instances that may reduce or eliminate the difference in performance. Alternatively, the list of potentially relevant parameters may be provided, and the user may make a determination as to any configuration changes to be made. One advantage of providing such a list is that the customer is provided an ordered listing of relevant parameters that may help the customer make more intelligent choices so that the customer's resources provide the desired services with the desired performance level.

In some embodiments, the resource analysis service 180 may select a period of time for analysis for comparison with another time period. For example, the resource analysis service 180 may select a group of instances that are exhibiting poor performance with respect to a metric of interest during the current week, and the resource analysis service 180 may select the same instances over a previous time period when performance with respect to the same parameters were good. The resource analysis service 180 may then determine one or more parameters that may indicate a likely cause for the difference in performance.

The service provider may also save a set of resources for continued use as a baseline set of resources for comparison with other resources. For example, if the service provider has identified a set of characteristics that exhibit a particular best practice that the service provider wants to save as a pattern for future matches, then the service provider may select that set of characteristics and identify the set of characteristics as a baseline or test group for comparison with other metrics at a later time.

Figure 8:
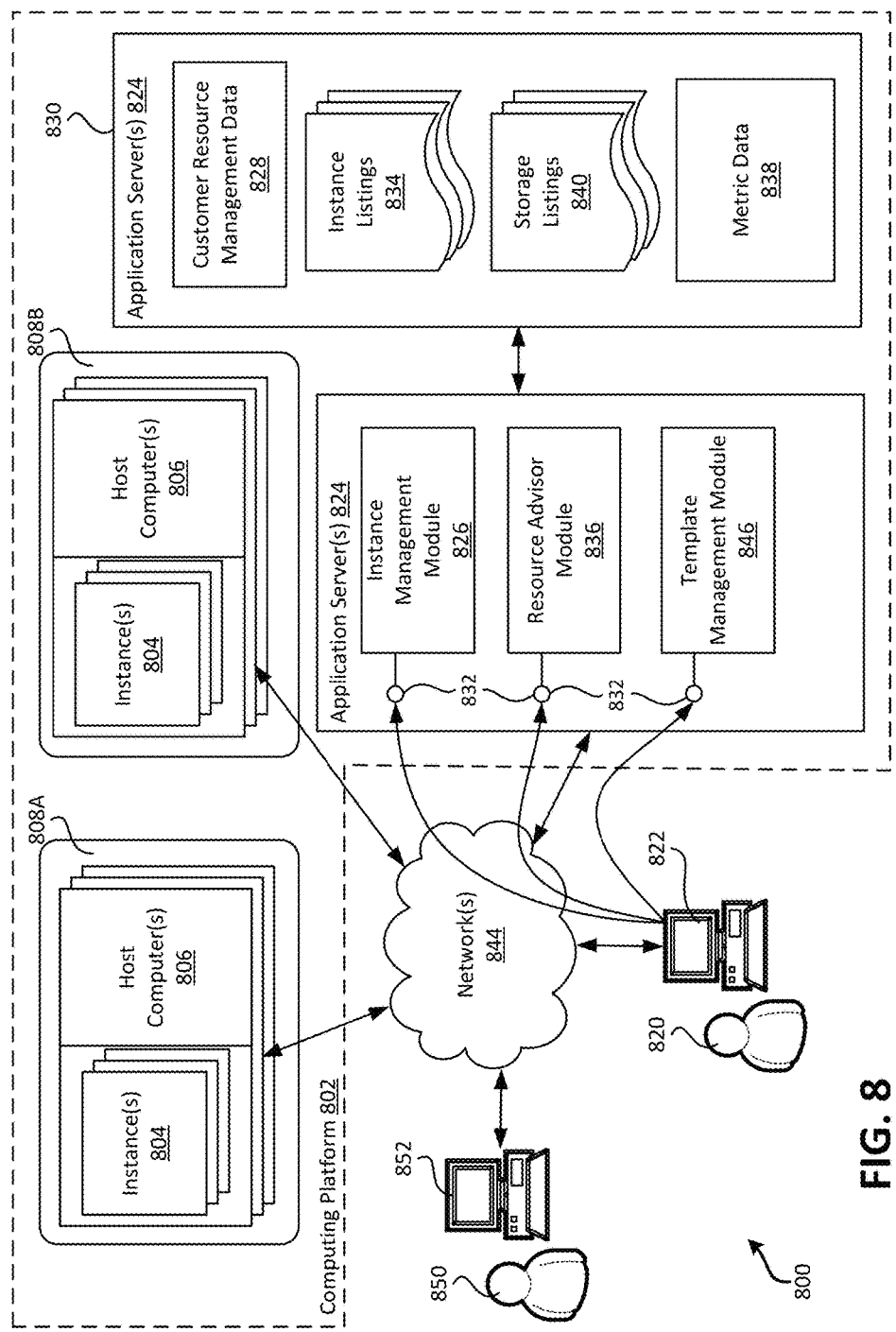
FIG. 8 is a diagram illustrating a system for providing resource analysis in accordance with the present disclosure.

FIG. 8 is a system diagram that shows an illustrative operating environment 800 including several components for implementing the resource analysis service 180. The environment 800 may include a computing platform 802. The computing platform 802 may be implemented by a computing resource provider to make computing resources available to customers 820 for the deployment and execution of distributed applications.

The computing resources provided by the computing platform 802 may include various classes of resources, such as data processing resources, data storage resources, data communication resources, and the like. Each class of computing resource may be general purpose or may be available in a number of specific configurations. For example, data processing resources provided by the computing resource provider may be made available in discrete units or instances 804. Each instance 804 may represent the data processing resources of a dedicated host computer 806, referred to herein as a dedicated tenancy instance, or each instance 804 may represent a virtual machine instance executing on a host computer 806, which may also be referred to as a shared tenancy instance.

The host computers 806 may represent generic multi-processor server devices, special purpose hardware devices, and the like. As discussed above, various types and configurations of instances 804 may be made available. For example, each available instance 804 of data processing resources may be of a particular size-such as small, medium, and large-representing different combinations of physical and/or virtual resources comprising or allocated to the instance—such as number and types of processors, amounts of memory, size and speed of local storage, number of networking addresses or communication channels, and/or the like. An instance 804 may further be configured with a particular platform, such as a specific OS and/or hypervisor installed on the instance. Instances 804 may also be made available with specific application software components installed, such as web server software, database management software, portal software, a specific runtime environment or platform, and the like.

Instances may further be available in specific availability zones 808A and 808B, as described above. As discussed above, an availability zone 808 may represent a particular physical location, such as a data center or other physical and/or logical grouping of underlying host computers 806 and computing devices supporting the instances 804 provided by the computing platform 802. Providing instances 804 in different sizes and in different availability zones 808 may allow a deployed application to be geographically dispersed, improving end-user performance and insulating the overall application from failures in one particular location or zone. For example, a customer 820 may choose to deploy a number of small instances 804 across multiple availability zones 808 for some functions of the application, such as web servers, while deploying a single large instance 804 for other functions, such as a database server, for example. The customer 820 may also require that instances 804 be hosted by host computers 806 in particular geographical locations for geopolitical reasons as well.

End-users 850 may utilize end-user computer systems 852 to access the functionality of the application executing on the allocated instances 804 through one or more networks 844. The network(s) 844 may represent a combination of local-area networks (LANs), wide-area networks (WANs), the Internet, and/or any other networking infrastructure known in the art that connects the host computers 806 in the computing platform 802 to the end-user computer systems 852, to each other and to other computing resources. The end-user computer systems 852 may represent personal computers (PCs), desktop workstations, laptops, notebooks, personal digital assistants (PDAs), electronic-book readers, game consoles, set-top boxes, consumer electronics devices, server computers, or any other computing device capable of connecting to the network(s) 844 and communicating with the host computers 806 in the computing platform 802.

A customer 820 wishing to access resources on the computing platform 802 may similarly utilize a customer computer system 822 to connect the computing platform over the network(s) 844 and to configure and manage the computing resources provided by the computing platform. In this regard, the computing platform 802 may include a number of application servers 824 that provide various management services to the customer 820 for purchasing and maintaining instances 804 of data processing and/or other computing resources, deploying components of the application across the purchased instances 804, monitoring and administering execution of the application, and the like. As in the case of the end-user computer systems 852, the customer computer systems 822 may represent PCs, desktop workstations, laptops, notebooks, PDAs, electronic-book readers, game consoles, set-top boxes, consumer electronics devices, server computers or any other computing device capable of connecting to the network(s) 844, and communicating with the application servers 824 in the computing platform 802.

The application servers 824 may represent standard server computers, database servers, web servers, network appliances, desktop computers, other computing devices, and any combination thereof. The application servers 824 may execute a number of modules in order to provide the management services. The modules may execute on a single application server 824 or in parallel across multiple application servers in the computing platform 802. In addition, each module may consist of a number of subcomponents executing on different application servers 824 or other computing devices in the computing platform 802. The modules may be implemented as software, hardware, or any combination of the two.

The application servers 824 may execute an instance management module 826. The instance management module 826 may allow customers 820 to purchase and configure instances 804 of data processing or other computing resources, manage and maintain purchased instances 804 and the like. Instances 804 may include instances that may be obtained through various modes, such as reserved instances, spot instances, and on-demand instances as described above. Purchased instances 804 for each customer 820 and corresponding configuration and status information may be stored in customer resource management data 828. The customer resource management data 828 may be stored in a database 830 or other data storage system available to the application server(s) 824 in the computing platform 802.

As described above, reserved instances provide the customer with the ability to reserve a number of a specific type and configuration of instances for a term, such as one year or three years. The reserved instances may represent actual instances of data processing resources configured as specified and placed in stand-by for launch and deployment by the customer 820 at a future time, or the reserved instances 804 may represent overall capacity reserved by the computing resource provider for quick configuration and launch when required. When deploying an application, a customer 820 may purchase and launch a number of on-demand instances 804 of a specific type and configuration (e.g., size, platform, tenancy, availability zone, and the like) to support immediate availability of the application, as well as a number of reserved instances of the same or similar type and configuration for scaling up the application in the future in response to increased demand or capacity requirements of the application, for example.

A customer 820 may utilize a web browser application executing on the customer computer system 822 to access a user interface presented by the instance management module 826 through a web service to perform the configuration and maintenance of the customer's purchased instances 804. The customer 820 may also utilize a web browser application executing on the customer computer system 822 to access a user interface presented by the template management module 846 or resource advisor module 836 through a web service to request templates as discussed above. Additionally or alternatively, the instance management module 826, resource advisor module 836, and/or template management module 846 may expose an application programming interface (API) 832, which may be accessed over the network(s) 844 by stand-alone application programs executing on the customer computer system 822. Other mechanisms for accessing the configuration and maintenance services of the instance management module 826, resource advisor module 836, or resource status manager module 846 may also be imagined, including remote procedure calls, SOAP-based web services, remote file access, proprietary client-server architectures, and the like.

In some embodiments, the instance management module 826 may allow customers 820 to purchase both on-demand instances and reserved instances. On-demand instances may be purchased and launched immediately, allowing for quick deployment of the components of the application. On-demand instances may further be added or removed as needed, either manually or automatically through auto scaling, as demand for or capacity requirements of the application changes over time. The customer 820 may incur ongoing usage costs related to their on-demand instances, based on the number of hours of operation of the instances 804 and/or the actual resources utilized, for example.

The customer 820 may submit a request that includes one or more parameters so that resource advisor module 836 can determine potentially relevant parameters for selected resources and metrics of interest. The resource advisor module 836 and template manager module 846 may access the instance listings 834, storage listings 840, and metric data 838 in the database 830 to access metrics data and process the metrics data to generate recommendations and templates regarding customer 820's resources.

The application servers 824 may execute resource advisor module 836 and template manager module 846. The customer 820 may utilize a web browser application executing on the customer computer system 822 to access a user interfaces (UI) presented by the resource advisor module 836 and template manager module 846 through a web service. Additionally or alternatively, the resource advisor module 836 and resource status manager module 846 may expose an API 832, which may be accessed over the network(s) 844 by stand-alone application programs executing on the customer computer system 822.

The resource advisor module 836 and resource status manager module 846 may further store data records regarding submitted and fulfilled requests in the database 830 or other data storage system. The metrics data 838 may also be utilized by customer 820 or the computing resource provider to record billing data regarding the requested analysis.

Figure 9:
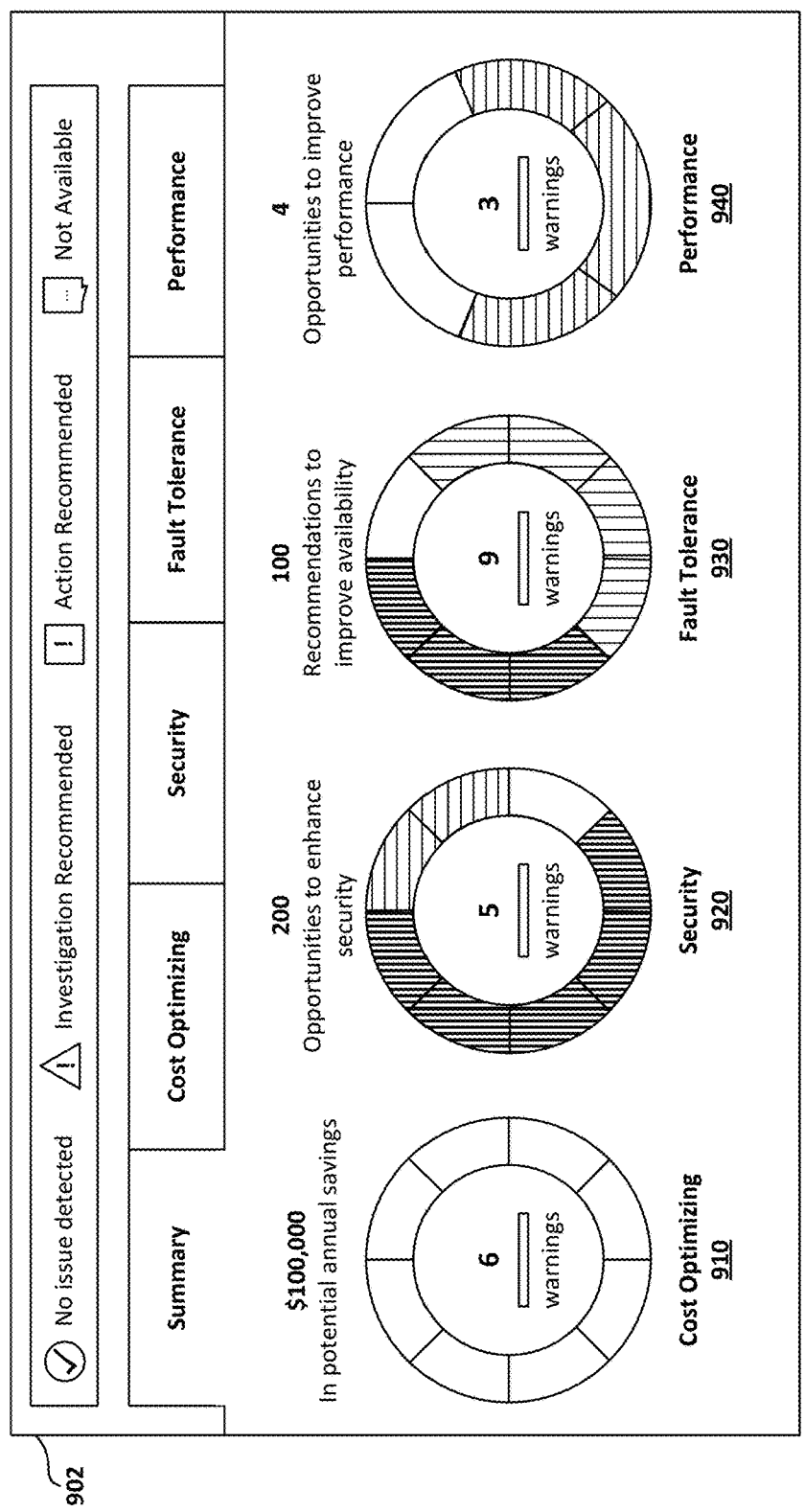
FIG. 9 is a diagram illustrating an example user interface in accordance with the present disclosure.

The user can also be provided a user interface for viewing recommendations from the resource advisor module 836 and templates generated by template manager module 846. For example, the user may be able to access a user interface, such as the one shown in FIG. 9. In one embodiment, a customer may utilize a user interface 902 presented by the resource advisor module 836 of FIG. 8 to review recommendations. For example, as shown in FIG. 8, the resource advisor module 836 or another module in the computing platform 802 may present a user interface (UI) 902 to the customer 820 in a window of a web browser or other client application executing on the customer computer system 822. The UI 902 may include a summary of recommendations currently associated with the customer 820, including a summary for cost optimizing 910, security 920, fault tolerance 930, and performance 940. These fields are provided to illustrate examples of possible user interface options that may be provided to a customer. As further described herein, additional fields may be provided, and some of the fields may be optional.

In some embodiments, an API or a programming interface sub-system may be provided for facilitating the submission of information pertaining to recommendations or templates. The API may be configured to receive electronic messages that encode identifiers indicative of request for fulfillment by the provider network. In response to receiving one of the electronic messages, the API may send second electronic messages indicative of information indicating that the request has been received. An API may also be provided that can facilitate exchange of data with applications that may provide additional information for submitting requests.

In additional embodiments, the resource advisor module 836 or template manager module 846 or other modules in the computing platform 802 may provide user interfaces or APIs 832 to the customer 820 and/or customer computer system 822 that allow the customer 820 to submit or review other information.

Figure 10:
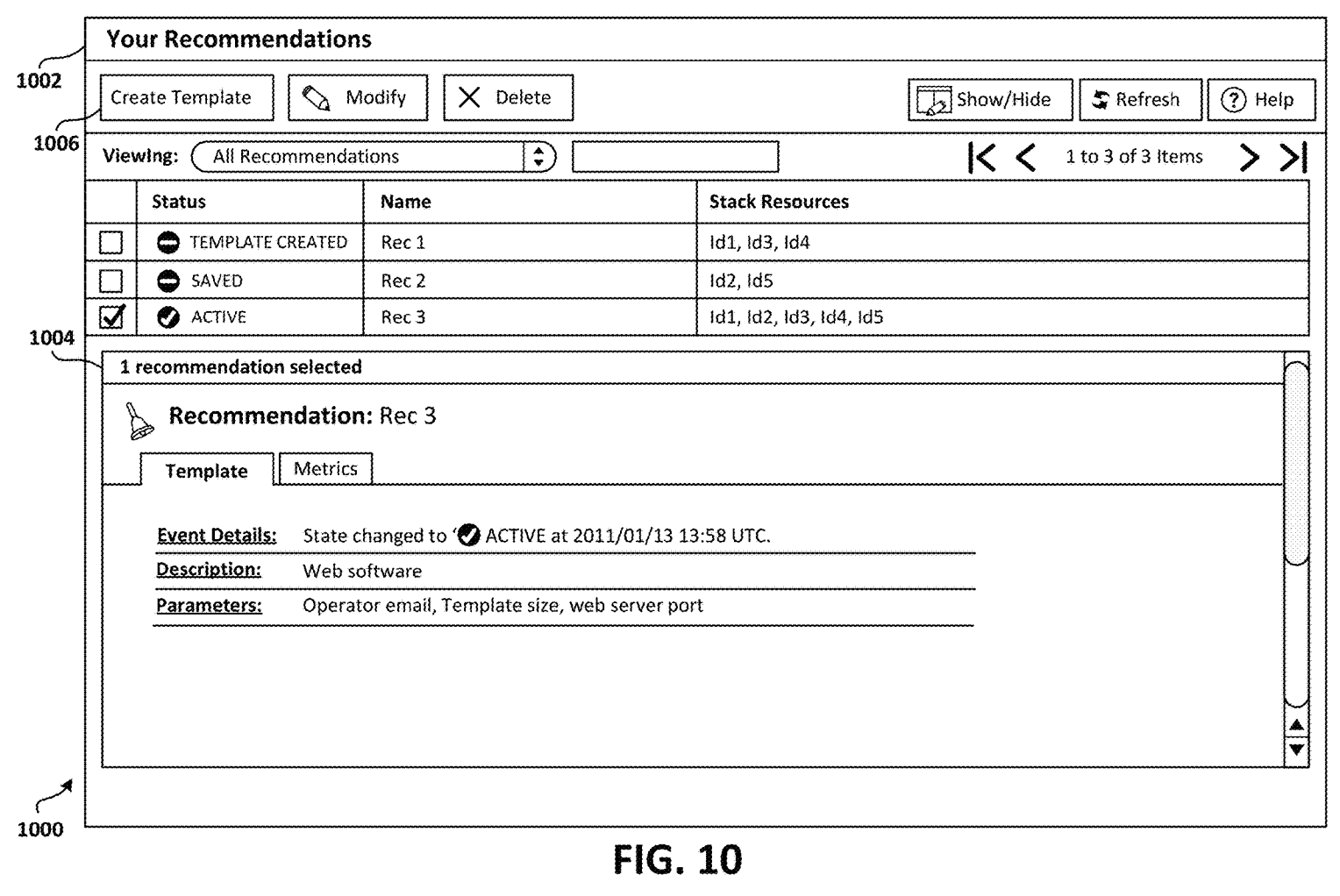

The user can also be provided a user interface for reviewing recommendations and generating templates. For example, the user may be able to access a user interface, such as the one shown in FIG. 10. In one embodiment, a customer may utilize a user interface presented by the template manager module 846 of FIG. 8 to review templates. For example, as shown in FIG. 8, the template manager module 846 or another module in the computing platform 802 may present a user interface (UI) 1000 to the customer 820 in a window 1002 of a web browser or other client application executing on the customer computer system 822. The UI 1000 may include a listing of recommendations and templates currently associated with the customer 820, including the name, state, and current stack resources associated with the templates. The user interface 1000 may also provide details for a selected recommendation 1004 that indicates specific details for the selected recommendation and an associated template, if one was created. Additionally, a customer may activate a button or other interface 1006 to create a template for a selected recommendation. These fields are provided to illustrate examples of possible user interface options that may be provided to a customer. As further described herein, additional fields may be provided, and some of the fields may be optional.

Figure 11:
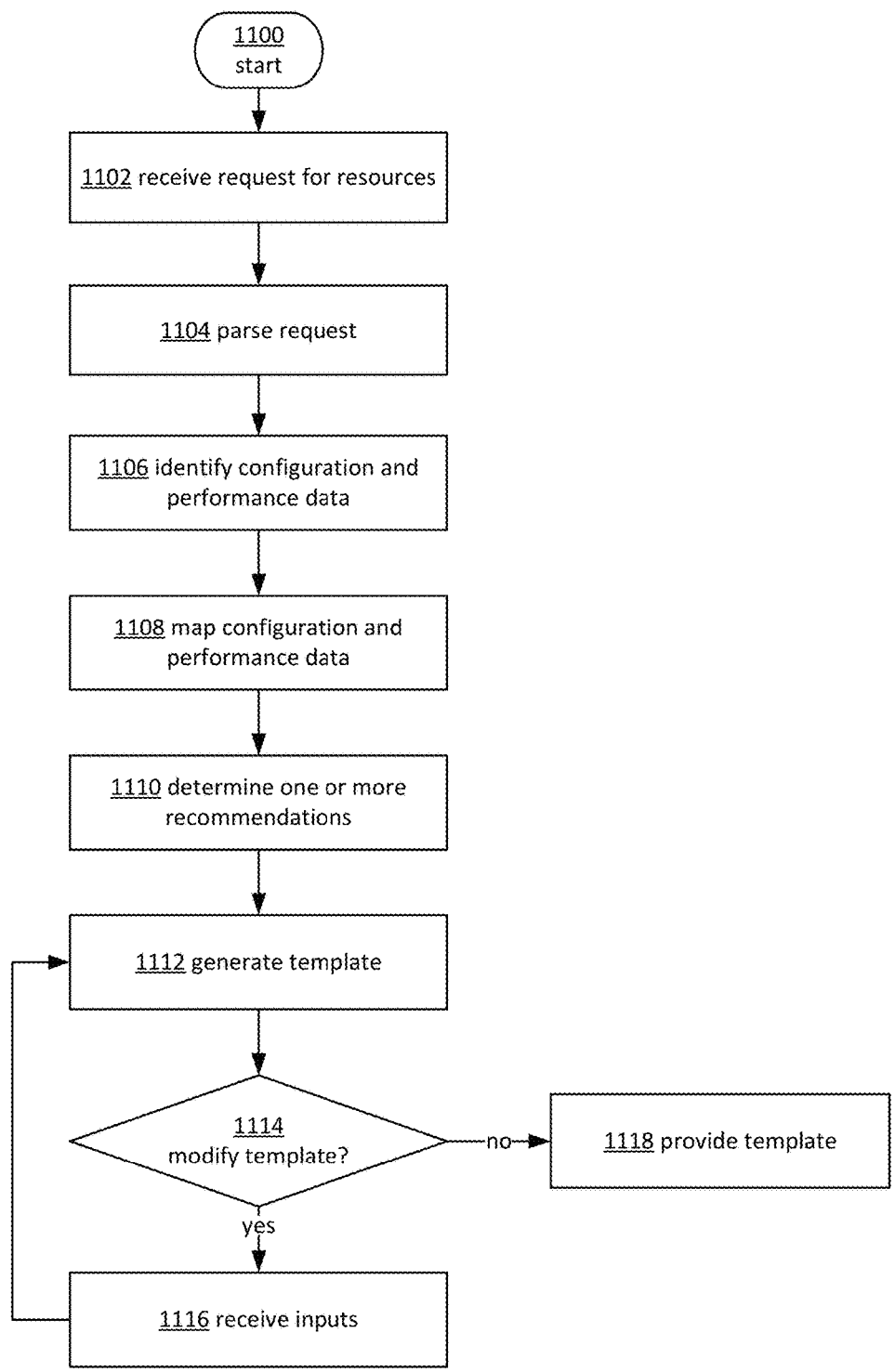
FIG. 11 is a flowchart depicting an example procedure for providing resource analysis in accordance with the present disclosure.

FIG. 11 illustrates an example operational procedure for providing computing resources in a provider network. In an embodiment, a mechanism for providing status can be provided by services, such as resource analysis service 180 in FIG. 1. The operational procedure may be implemented in a system comprising one or more computing devices. Referring to FIG. 11, operation 1100 begins the operational procedure. Operation 1100 may be followed by operation 1102. Operation 1102 illustrates receiving, from a client, a request associated with computing resources. The computing resources may include any resources provided by the provider network including a virtual machine instance, a storage resource, a network resource, an application, and so on.

Operation 1102 may be followed by operation 1104. Operation 1104 illustrates parsing the request received from the client. Operation 1104 may be followed by operation 1106. Operation 1106 illustrates identifying configuration and performance data associated with the requested computing resources. Operation 1106 may be followed by operation 1108. Operation 1108 illustrates mapping the configuration and performance data to determine the one or more recommendations. The mapping may, for example, be performed based on best practices pertaining to an industry protocol, metrics associated with the requested resources, or a service-oriented architecture. The mapping may also, for example, be performed based on input from a third party source.

Operation 1108 may be followed by operation 1110. Operation 1110 illustrates determining one or more recommendations based at least in part on the analysis of the requested computing resources. Operation 1110 may be followed by operation 1112. Operation 1112 illustrates generating a template based at least in part on the one or more recommendations. In one embodiment, the generated template may be usable via an application programmatic interface (API) to configure a set of computing resources of the provider network.

Operation 1112 may be followed by operation 1114. Operation 1114 illustrates determining if the generated template should be modified. If the generated template should be modified, then operation 1114 may be followed by operation 1116. Operation 1116 illustrates receiving inputs for the modification. Operation 1116 may be followed by operation 1112 where an updated template may be generated. If the generated template does not need to be modified, then operation 1114 may be followed by operation 1118. Operation 1118 illustrates providing the generated template via the API to the client.

The client or customer may be provided options to use the generated template to modify the generated template, apply the generated template to the requested resources, apply the generated template to other resources (for example, other resources already allocated to the client or customer), and/or instantiation of new resources.

Each of the processes, methods, and algorithms described in the preceding sections may be embodied in, and fully or partially automated by, code modules executed by one or more computers or computer processors. The code modules may be stored on any type of non-transitory computer-readable medium or computer storage device, such as hard drives, solid state memory, optical disc, and/or the like. The processes and algorithms may be implemented partially or wholly in application-specific circuitry. The results of the disclosed processes and process steps may be stored, persistently or otherwise, in any type of non-transitory computer storage such as, e.g., volatile or non-volatile storage.

The various features and processes described above may be used independently of one another, or may be combined in various ways. All possible combinations and subcombinations are intended to fall within the scope of this disclosure. In addition, certain method or process blocks may be omitted in some implementations. The methods and processes described herein are also not limited to any particular sequence, and the blocks or states relating thereto can be performed in other sequences that are appropriate. For example, described blocks or states may be performed in an order other than that specifically disclosed, or multiple blocks or states may be combined in a single block or state. The example blocks or states may be performed in serial, in parallel, or in some other manner. Blocks or states may be added to or removed from the disclosed example embodiments. The example systems and components described herein may be configured differently than described. For example, elements may be added to, removed from or rearranged compared to the disclosed example embodiments.

It will also be appreciated that various items are illustrated as being stored in memory or on storage while being used, and that these items or portions of thereof may be transferred between memory and other storage devices for purposes of memory management and data integrity. Alternatively, in other embodiments some or all of the software modules and/or systems may execute in memory on another device and communicate with the illustrated computing systems via inter-computer communication. Furthermore, in some embodiments, some or all of the systems and/or modules may be implemented or provided in other ways, such as at least partially in firmware and/or hardware, including, but not limited to, one or more application-specific integrated circuits (ASICs), standard integrated circuits, controllers (e.g., by executing appropriate instructions, and including microcontrollers and/or embedded controllers), field-programmable gate arrays (FPGAs), complex programmable logic devices (CPLDs), etc. Some or all of the modules, systems and data structures may also be stored (e.g., as software instructions or structured data) on a computer-readable medium, such as a hard disk, a memory, a network, or a portable media article to be read by an appropriate drive or via an appropriate connection. The systems, modules, and data structures may also be transmitted as generated data signals (e.g., as part of a carrier wave or other analog or digital propagated signal) on a variety of computer-readable transmission media, including wireless-based and wired/cable-based media, and may take a variety of forms (e.g., as part of a single or multiplexed analog signal or as multiple discrete digital packets or frames). Such computer program products may also take other forms in other embodiments. Accordingly, the present invention may be practiced with other computer system configurations.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements, and/or steps. Thus, such conditional language is not generally intended to imply that features, elements, and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

While certain example embodiments have been described, these embodiments have been presented by way of example only and are not intended to limit the scope of the inventions disclosed herein. Thus, nothing in the foregoing description is intended to imply that any particular feature, characteristic, step, module, or block is necessary or indispensable. Indeed, the novel methods and systems described herein may be embodied in a variety of other forms; furthermore, various omissions, substitutions, and changes in the form of the methods and systems described herein may be made without departing from the spirit of the inventions disclosed herein. The accompanying claims and their equivalents are intended to cover such forms or modifications as would fall within the scope and spirit of certain of the inventions disclosed herein.

What is claimed is:

1. A computer-implemented method for providing computing resources by a provider network, the method comprising:
   receiving, from a client, a request associated with the computing resources;
   in response to receiving the request, determining a plurality of recommendations based at least in part on an analysis of the computing resources, a requested use of the computing resources, and one or more of industry best practices associated with the requested use, architectural guidance, cost parameters, and policies, wherein the plurality of recommendations comprises a first recommendation based on a first ranking of priorities associated with the computing resources and a determination of one or more conflicts associated with the priorities and a second recommendation based on a second ranking of the priorities, wherein a first priority is highest ranked in the first ranking, and wherein a second priority is highest ranked in the second ranking;
   providing a user interface that displays a listing of a set of recommendations and a set of templates associated with a customer of the provider network, wherein the user interface provides a first field that is selectable to request generation of one or more templates for one or more selected recommendations of the set of recommendations;
   in response to a selection of the first field, generating a first template based at least in part on one or more of the plurality of recommendations;
   receiving, from the customer of the provider network, one or more modifications to the first template; and
   updating the first template based on the one or more modifications, wherein the first template is usable to configure at least a first resource of the provider network.

2. The method according to claim 1, wherein the computing resources include one or more of a virtual machine instance, a storage resource, a network resource, and an application.

3. The method according to claim 1, wherein the plurality of recommendations are determined using at least a learning algorithm.

4. The method according to claim 1, wherein the analysis further comprises mapping best practices pertaining to one or more of an industry protocol, metrics associated with the computing resources, and a service-oriented architecture.

5. The method according to claim 1, wherein the analysis further comprises mapping best practices pertaining to recommendations received from a third party source.

6. The method according to claim 1, wherein the priorities include one or more characteristics of the computing resources.

7. A system configured to allocate computing resources, the system comprising:
   at least one memory having stored therein computer instructions that, upon execution by one or more processors of the system, at least cause the system to:
   in response to receiving a request associated with the computing resources, determine a plurality of recommendations based at least in part on an analysis of the request, the analysis comprising identifying configuration and performance data associated with the computing resources, wherein the analysis comprises parsing the request and mapping the configuration and performance data to determine the one or more recommendations, wherein the plurality of recommendations comprises a first recommendation based on a first ranking of priorities associated with the computing resources and a determination of one or more conflicts associated with the priorities and a second recommendation based on a second ranking of the priorities, wherein a first priority is highest ranked in the first ranking, and wherein a second priority is highest ranked in the second ranking;
   provide a user interface that displays a listing of a set of recommendations and a set of templates associated with a customer of a provider network, wherein the user interface provides a first field that is selectable to request generation of one or more templates for one or more selected recommendations of the set of recommendations;
   in response to a selection of the first field, generate a first template based at least in part on one or more of the plurality of recommendations;
   receive, from the customer, one or more modifications to the first template; and
   update the first template based on the one or more modifications, wherein the first template is usable to configure at least a first resource of the provider network.

8. The system according to claim 7, wherein the plurality of recommendations pertain to at least one of cost, security, fault tolerance, certification, and performance of a requested use associated with the computing resources.

9. The system according to claim 7, wherein the first template comprises a declaration of one or more parameters associated with the computing resources.

10. The system according to claim 7, wherein the computing resources are virtual machine instances and the plurality of recommendations pertain to cost and computing performance of the virtual machine instances.

11. The system according to claim 7, wherein the plurality of recommendations are determined based at least in part on an aggregated operational history of the provider network.

12. The system according to claim 7, wherein said generate the first template comprises:
   accessing information regarding a current configuration associated with a computing resource pertaining to the one or more of the plurality of recommendations;
   generating the first template based at least in part on the accessed information; and
   modifying the first template to incorporate the one or more of the plurality of recommendations.

13. The system according to claim 7, wherein the plurality of recommendations are determined based at least in part on analysis of metrics associated with the computing resources.

14. The system according to claim 7, wherein the plurality of recommendations are determined based at least in part on one or more of a cost optimization function, a security optimization function, a performance optimization function, and a fault tolerance function.

15. The system according to claim 7, wherein the plurality of recommendations are determined based at least in part on certification and support requirements.

16. The system according to claim 7, wherein the plurality of recommendations are determined based at least in part on industry standards.

17. The system according to claim 7, further comprising computer instructions that, upon execution by the one or more processors of the system, at least cause the system to instantiate at least one computing resource of the provider network based at least in part on the first template.

18. A non-transitory computer-readable storage medium having stored thereon computer-readable instructions, the computer-readable instructions comprising instructions that upon execution on one or more computing devices, at least cause the one or more computing devices to:

provide an interface configured to receive data indicative of a plurality of recommendations pertaining to computing resources associated with a customer of a provider network, wherein the plurality of recommendations comprises a first recommendation based on a first ranking of priorities associated with the computing resources and a determination of one or more conflicts associated with the priorities and a second recommendation based on a second ranking of the priorities, wherein a first priority is highest ranked in the first ranking, and wherein a second priority is highest ranked in the second ranking;

providing a user interface that displays a listing of a set of recommendations and a set of templates associated with the customer of the provider network, wherein the user interface provides a first field that is selectable to request generation of one or more templates for one or more selected recommendations of the set of recommendations;

in response to a selection of the first field, generating a first template based at least in part on one or more of the plurality of recommendations;

receiving, from the customer, one or more modifications to the first template; and updating the first template based on the one or more modifications, the first template being usable to configure at least a first resource by the provider network.

19. The non-transitory computer-readable storage medium of claim 18, wherein the interface is an API configured to:

receive first electronic messages that encode identifiers indicative of the plurality of recommendations; and in response to receiving one of the first electronic messages, send second electronic messages indicative of information pertaining to the first template.

* * * * *